US005838666A

United States Patent [19]

Igarashi et al.

[11] Patent Number: 5,838,666

[45] Date of Patent: Nov. 17, 1998

[54] RECORDING MEDIUM MANAGEMENT METHOD WHERE RECORDING IS CARRIED OUT BY DATA RECORDING UNITS IN ACCORDANCE WITH MANAGEMENT TABLES

[75] Inventors: Tatsuya Igarashi, Kanagawa; Katsuyuki Teranishi, Tokyo, both of Japan

[73] Assignee: Sony Corporation, Tokyo, Japan

[21] Appl. No.: 374,727

[22] PCT Filed: Jun. 14, 1994

[86] PCT No.: PCT/JP94/00964

§ 371 Date: Mar. 20, 1995

§ 102(e) Date: Mar. 20, 1995

[87] PCT Pub. No.: WO94/29867

PCT Pub. Date: Dec. 22, 1994

[30] Foreign Application Priority Data

Jun. 14, 1993 [JP] Japan .................................... 5-141819
Oct. 28, 1993 [JP] Japan .................................... 5-270099

[51] Int. Cl.[6] ........................................................ G11B 7/00

[52] U.S. Cl. ........................................... 369/275.3; 369/32

[58] Field of Search ................................ 369/47, 48, 32, 369/54, 58, 59, 275.1–275.4

[56] References Cited

U.S. PATENT DOCUMENTS 5,392,265 2/1995 Takezawa ................................. 369/54
5,426,624 6/1995 Goto .......................................... 369/54
5,432,768 7/1995 Terashima et al. ....................... 369/58
5,477,525 12/1995 Okabe ....................................... 369/58
5,493,558 2/1996 Kihara ................................. 369/275.2
5,519,681 5/1996 Maeda et al. ............................. 369/54
5,535,125 7/1996 Okabe ................................. 369/275.3
5,537,636 7/1996 Uchida et al. ............................ 369/59
5,546,365 8/1996 Roth .......................................... 369/54
5,553,048 9/1996 Maeda ....................................... 369/48
5,553,055 9/1996 Yokota et al. ............................ 369/47
5,561,644 10/1996 Kondo ....................................... 369/54
5,650,991 7/1997 Fujiie .................................. 369/275.3

FOREIGN PATENT DOCUMENTS

0448378 A2 9/1991 European Pat. Off. .
0613144 A2 8/1994 European Pat. Off. .
64-59689 3/1989 Japan .
5-89643 4/1993 Japan .

OTHER PUBLICATIONS

Patent Abstracts of Japan, vol. 13, No. 471 (P–949), Oct. 25, 1989, JP–A–01 184763 (Hitachi Ltd.), Jul. 24, 1989, Inv: Haruo Takeda.

*Primary Examiner*—Nabil Hindi
*Attorney, Agent, or Firm*—Limbach & Limbach L.L.P.

[57] ABSTRACT

In the case of recording computer data, e.g., into clusters 16 to 27 of the data recording area, the range of clusters 16 to 27 is ensured as an available range in a management table (parts table) of U-TOC. For example, onto parts table of No. 02h, such computer data is recorded as a segment in which cluster 16 is caused to be start address and cluster 27 is caused to be end address. For the purpose of carrying out management of recording state of computer data, FAT (File Allocation Table) is separately provided. At this table, management of recording states of clusters 16 to 27 is carried out.

Thus, computer data can be recorded onto mini-disc for recording audio data.

29 Claims, 26 Drawing Sheets

| | 16BIT | | 16BIT | | |
|---|---|---|---|---|---|
| | MSB LSB | MSB LSB | MSB LSB | MSB LSB | |
| HEADER | 00000000 | 11111111 | 11111111 | 11111111 | 0 |
| | 11111111 | 11111111 | 11111111 | 11111111 | 1 |
| | 11111111 | 11111111 | 11111111 | 00000000 | 2 |
| | CLUSTER | CLUSTER | 00000000 | 00000000 | 3 |
| | 00000000 | 00000000 | 00000000 | 00000000 | 4 |
| | 00000000 | 00000000 | 00000000 | 00000000 | 5 |
| | | | | | 6 |
| | | | FIRST TNO | LAST TNO | 7 |
| | | | | USED SECTORS | 8 |
| | LOCATION OF FAT (LOFAT) | | | | 9 |
| | | | | | 10 |
| | DISC | ID | P-DFA | P-EMPTY | 11 |
| | P-FRA | P-TNO1 | P-TNO2 | P-TNO3 | 12 |
| | P-TNO4 | P-TNO5 | P-TNO6 | P-TNO7 | 13 |
| | P-TNO248 | P-TNO249 | P-TNO250 | P-TNO251 | 74 |
| | P-TNO252 | P-TNO253 | P-TNO254 | P-TNO255 | 75 |
| | | | | | 76 |
| | | | | | 77 |
| MANAGEMENT TABLE (255 PARTS TABLE) (01h) | START ADDRESS | | | TRACK MODE | 78 |
| | END ADDRESS | | | LINK INFORMATION | 79 |
| (02h) | START ADDRESS | | | TRACK MODE | 80 |
| | END ADDRESS | | | LINK INFORMATION | 81 |
| (03h) | START ADDRESS | | | TRACK MODE | 82 |
| | END ADDRESS | | | LINK INFORMATION | 83 |
| (FCh) | START ADDRESS | | | TRACK MODE | 500 |
| | END ADDRESS | | | LINK INFORMATION | 581 |
| (FDh) | START ADDRESS | | | TRACK MODE | 582 |
| | END ADDRESS | | | LINK INFORMATION | 583 |
| (FEh) | START ADDRESS | | | TRACK MODE | 584 |
| | END ADDRESS | | | LINK INFORMATION | 585 |
| (FFh) | START ADDRESS | | | TRACK MODE | 586 |
| | END ADDRESS | | | LINK INFORMATION | 587 |

| | 16BIT | | 16BIT | | |
|---|---|---|---|---|---|
| | MSB LSB | MSB LSB | MSB LSB | MSB LSB | |
| HEADER | 00000000 | 11111111 | 11111111 | 11111111 | 0 |
| HEADER | 11111111 | 11111111 | 11111111 | 11111111 | 1 |
| HEADER | 11111111 | 11111111 | 11111111 | 00000000 | 2 |
| HEADER | CLUSTER | CLUSTER | 00000000 | 00000000 | 3 |
| | 00000000 | 00000000 | 00000000 | 00000000 | 4 |
| | 00000000 | 00000000 | 00000000 | 00000000 | 5 |
| | | | | | 6 |
| | | | FIRST TNO | LAST TNO | 7 |
| | | | | USED SECTORS | 8 |
| | LOCATION OF FAT (LOFAT) | | | | 9 |
| | | | | | 10 |
| | DISC | ID | P-DFA | P-EMPTY | 11 |
| | P-FRA | P-TNO1 | P-TNO2 | P-TNO3 | 12 |
| | P-TNO4 | P-TNO5 | P-TNO6 | P-TNO7 | 13 |
| | | | | | |
| | | | | | |
| | P-TNO248 | P-TNO249 | P-TNO250 | P-TNO251 | 74 |
| | P-TNO252 | P-TNO253 | P-TNO254 | P-TNO255 | 75 |
| | | | | | 76 |
| | | | | | 77 |
| MANAGEMENT TABLE (255 PARTS TABLE) (01h) | START ADDRESS | | | TRACK MODE | 78 |
| | END ADDRESS | | | LINK INFORMATION | 79 |
| (02h) | START ADDRESS | | | TRACK MODE | 80 |
| | END ADDRESS | | | LINK INFORMATION | 81 |
| (03h) | START ADDRESS | | | TRACK MODE | 82 |
| | END ADDRESS | | | LINK INFORMATION | 83 |
| | | | | | |
| | | | | | |
| (FCh) | START ADDRESS | | | TRACK MODE | 500 |
| | END ADDRESS | | | LINK INFORMATION | 581 |
| (FDh) | START ADDRESS | | | TRACK MODE | 582 |
| | END ADDRESS | | | LINK INFORMATION | 583 |
| (FEh) | START ADDRESS | | | TRACK MODE | 584 |
| | END ADDRESS | | | LINK INFORMATION | 585 |
| (FFh) | START ADDRESS | | | TRACK MODE | 586 |
| | END ADDRESS | | | LINK INFORMATION | 587 |

FIG.3

P-FRA= 01h

U-TOC MANAGEMENT TABLE (PARTS TABLE)

| NO. | START ADDRESS | END ADDRESS | LINK INFOR-MATION |
|---|---|---|---|
| 01h | 9 | 12 | 0Ah |
| 02h | | | |
| 03h | | | |
| 04h | 104 | 105 | 07h |
| 05h | | | |
| 06h | | | |
| 07h | 82 | 87 | 00h |
| 08h | | | |
| 09h | | | |
| 0Ah | 29 | 30 | 04h |
| 0Bh | | | |
| 0Ch | | | |
| 0Dh | | | |
| 0Eh | | | |
| 0Fh | | | |
| ⋮ | ⋮ | ⋮ | ⋮ |
| FFh | | | |

CLUSTER

DATA RECORDING AREA

| 0 | 1 | 2 | 3 | 4 | 5 | 6 | 7 |
|---|---|---|---|---|---|---|---|
| 8 | 9 | 10 | 11 | 12 | | | |
| 16 | | | | | | | |
| 24 | | | | | 29 | 30 | |
| 32 | | | | | | | |
| 40 | | | | | | | |
| 48 | | | | | | | |
| 56 | | | | | | | |
| 64 | | | | | | | |
| 72 | | | | | | | |
| 80 | | 82 | 83 | 84 | 85 | 86 | 87 |
| 88 | | | | | | | |
| 96 | | | | | | | |
| 104 | 105 | | | | | | |
| 112 | | | | | | | |
| ⋮ | ⋮ | ⋮ | ⋮ | ⋮ | ⋮ | ⋮ | ⋮ |
| | | | | | | | |

FIG.5

LOFAT= 02h

P-FRA= 01h

U-TOC MANAGEMENT TABLE (PARTS TABLE)

| NO. | START ADDRESS | END ADDRESS | LINK INFORMATION |
|---|---|---|---|
| 01h | 9 | 12 | 0Ah |
| 02h | 16 | 27 | 00h |
| 03h | | | |
| 04h | 104 | 105 | 07h |
| 05h | | | |
| 06h | | | |
| 07h | 82 | 87 | 00h |
| 08h | | | |
| 09h | | | |
| 0Ah | 29 | 30 | 04h |
| 0Bh | | | |
| 0Ch | | | |
| 0Dh | | | |
| 0Eh | | | |
| 0Fh | | | |
| ⋮ | ⋮ | ⋮ | ⋮ |
| FFh | | | |

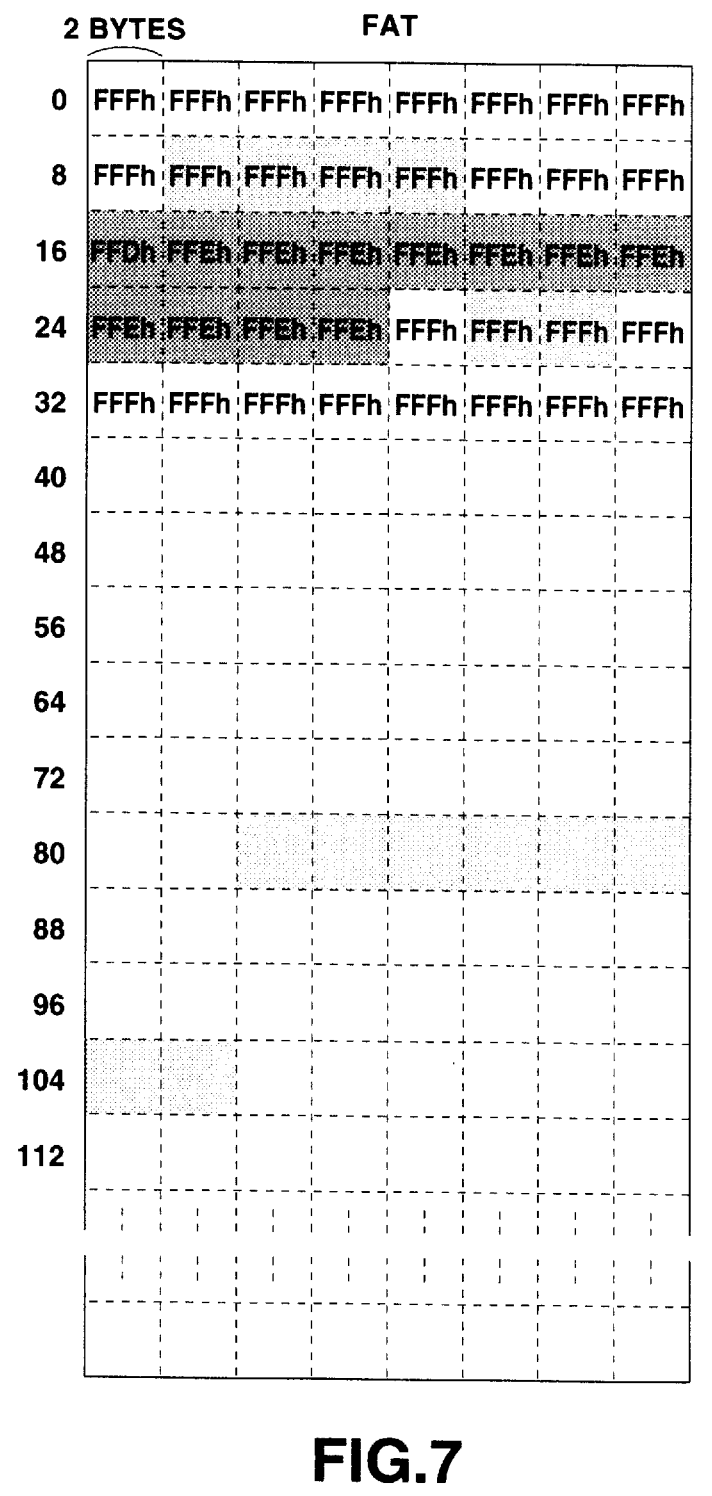

FAT

2 BYTES

| | | | | | | | | |
|---|---|---|---|---|---|---|---|---|
| 0 | FFFh | FFFh | FFFh | FFFh | FFFh | FFFh | FFFh | FFFh |
| 8 | FFFh | FFFh | FFFh | FFFh | FFFh | FFFh | FFFh | FFFh |
| 16 | FFDh | FFEh | FFEh | FFEh | FFEh | FFEh | FFEh | FFEh |
| 24 | FFEh | FFEh | FFEh | FFEh | FFFh | FFFh | FFFh | FFFh |
| 32 | FFFh | FFFh | FFFh | FFFh | FFFh | FFFh | FFFh | FFFh |
| 40 | | | | | | | | |
| 48 | | | | | | | | |
| 56 | | | | | | | | |
| 64 | | | | | | | | |
| 72 | | | | | | | | |
| 80 | | | | | | | | |
| 88 | | | | | | | | |
| 96 | | | | | | | | |
| 104 | | | | | | | | |
| 112 | | | | | | | | |

FIG.7

FAT

| | | | | | | | | |
|---|---|---|---|---|---|---|---|---|
| 0 | FFFh | FFFh | FFFh | FFFh | FFFh | FFFh | FFFh | FFFh |
| 8 | FFFh | FFFh | FFFh | FFFh | FFFh | FFFh | FFFh | FFFh |
| 16 | FFDh | 18 | 19 | 20 | FFDh | 22 | 23 | 24 |
| 24 | 25 | FFDh | FFEh | FFEh | FFFh | FFFh | FFFh | FFFh |
| 32 | FFFh | FFFh | FFFh | FFFh | FFFh | FFFh | FFFh | FFFh |
| 40 | | | | | | | | |
| 48 | | | | | | | | |
| 56 | | | | | | | | |
| 64 | | | | | | | | |
| 72 | | | | | | | | |
| 80 | | | | | | | | |
| 88 | | | | | | | | |
| 96 | | | | | | | | |
| 104 | | | | | | | | |
| 112 | | | | | | | | |

FIG.8

FLOW OF INITIALIZATION

FLOW OF WRITING OF FILE

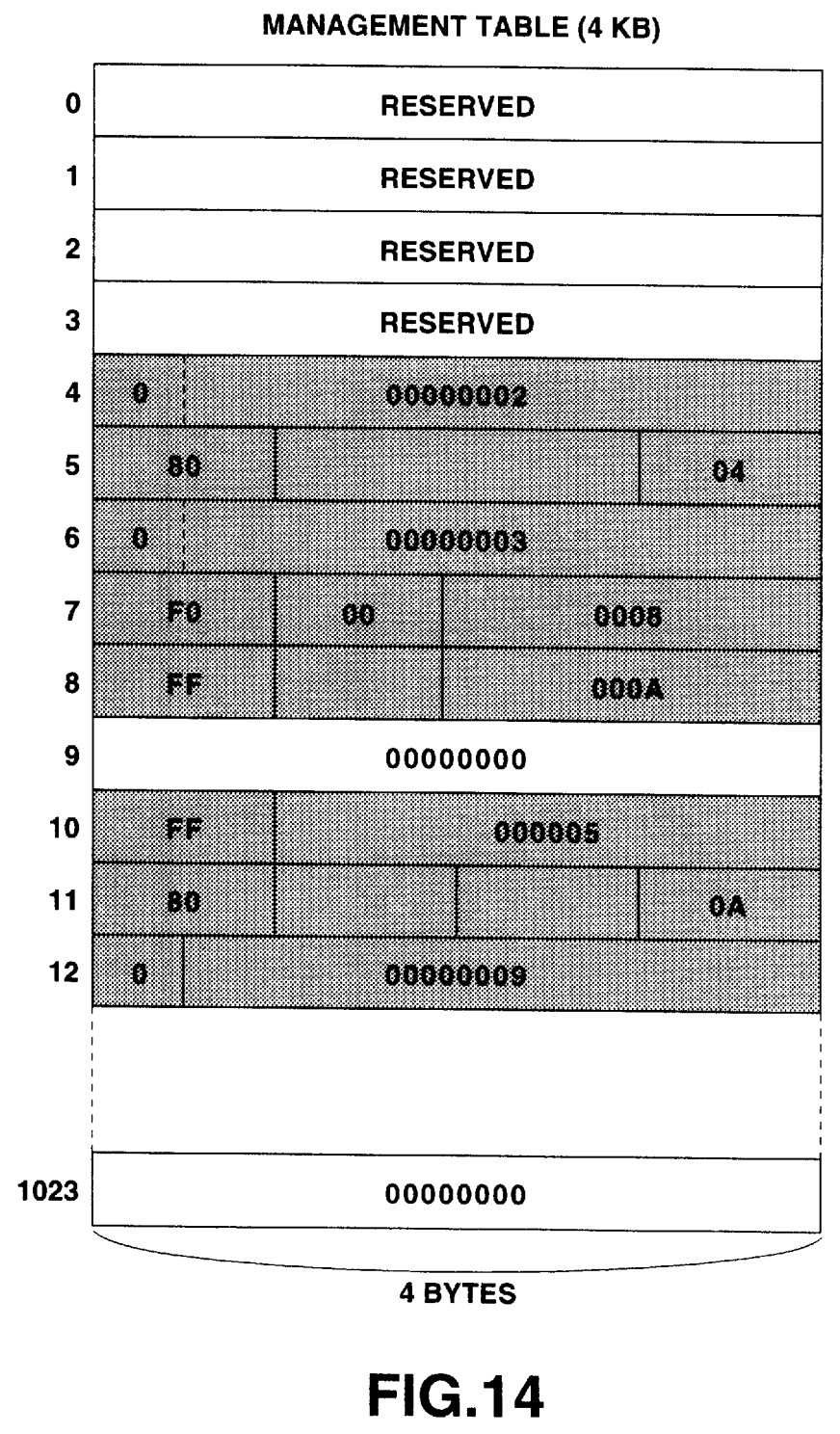

MANAGEMENT TABLE (4 KB)

| | | | | |
|---|---|---|---|---|
| 0 | RESERVED | | | |
| 1 | RESERVED | | | |
| 2 | RESERVED | | | |
| 3 | RESERVED | | | |
| 4 | 0 | 00000002 | | |
| 5 | 80 | | | 04 |
| 6 | 0 | 00000003 | | |
| 7 | F0 | 00 | 0008 | |
| 8 | FF | | 000A | |
| 9 | 00000000 | | | |
| 10 | FF | 000005 | | |
| 11 | 80 | | | 0A |
| 12 | 0 | 00000009 | | |
| 1023 | 00000000 | | | |

4 BYTES

FIG.14

DIRECTORY RECORDS BLOCK ENTRY
(CONSISTS OF ONLY ONE DRB) :

BIT 31

DIRECTORY RECORDS BLOCK ENTRY
(CONSISTS OF MORE THAN ONE DRB) : FIRST

DIRECTORY RECORDS BLOCK ENTRY
(CONSISTS OF MORE THAN ONE DRB) :
SECOND OR MORE THAN :

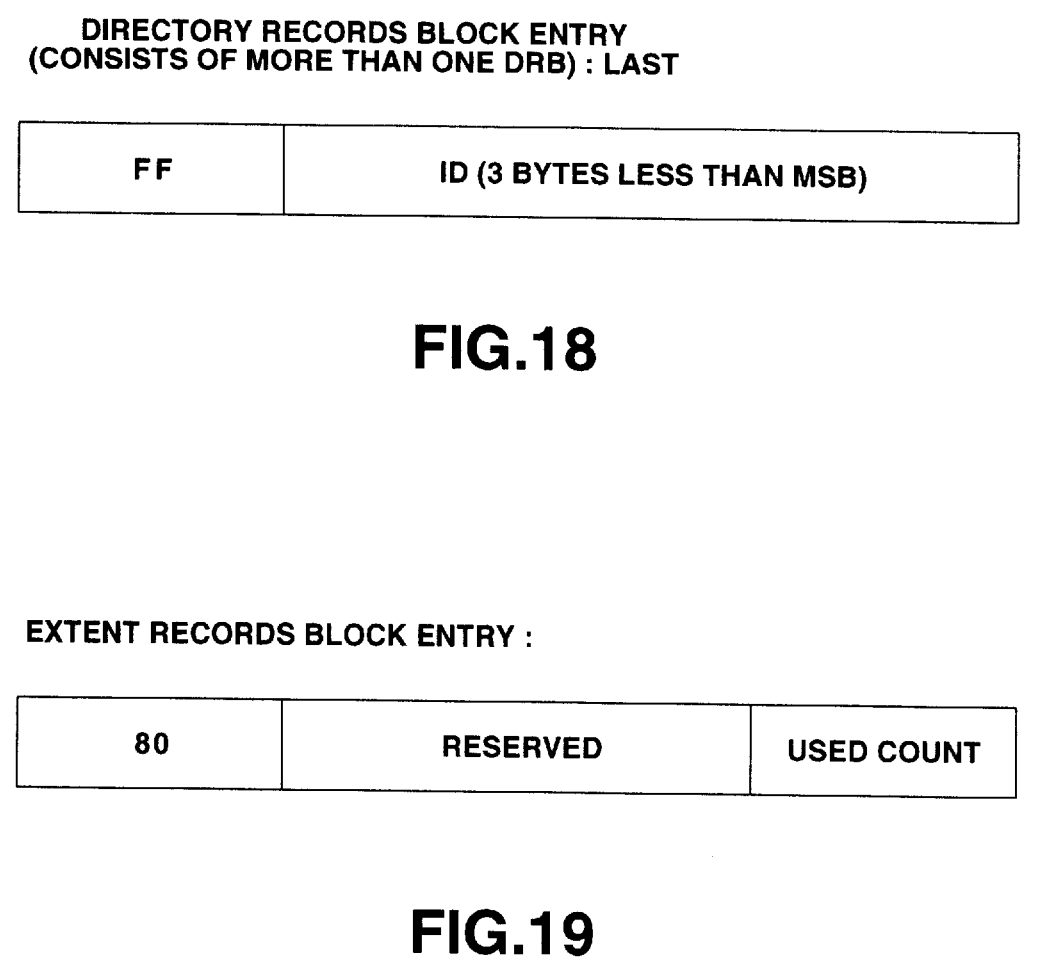

DIRECTORY RECORDS BLOCK ENTRY
(CONSISTS OF MORE THAN ONE DRB) : LAST

| FF | ID (3 BYTES LESS THAN MSB) |
|---|---|

FIG.18

EXTENT RECORDS BLOCK ENTRY :

| 80 | RESERVED | USED COUNT |
|---|---|---|

FIG.19

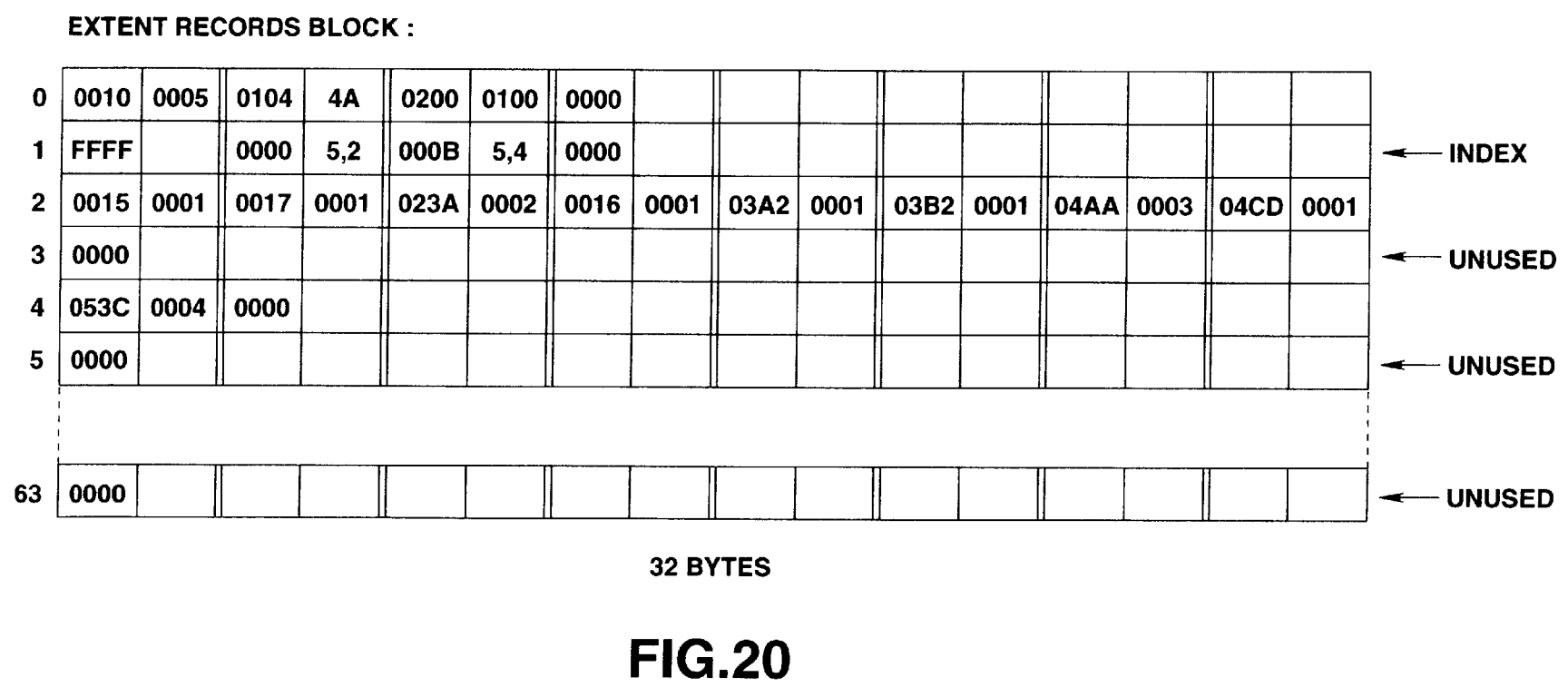

EXTENT RECORDS BLOCK :

| | | | | | | | | | | | | | | | | | |
|---|---|---|---|---|---|---|---|---|---|---|---|---|---|---|---|---|---|
| 0 | 0010 | 0005 | 0104 | 4A | 0200 | 0100 | 0000 | | | | | | | | | | |
| 1 | FFFF | | 0000 | 5,2 | 000B | 5,4 | 0000 | | | | | | | | | | ← INDEX |
| 2 | 0015 | 0001 | 0017 | 0001 | 023A | 0002 | 0016 | 0001 | 03A2 | 0001 | 03B2 | 0001 | 04AA | 0003 | 04CD | 0001 | |
| 3 | 0000 | | | | | | | | | | | | | | | | ← UNUSED |
| 4 | 053C | 0004 | 0000 | | | | | | | | | | | | | | |
| 5 | 0000 | | | | | | | | | | | | | | | | ← UNUSED |
| 63 | 0000 | | | | | | | | | | | | | | | | ← UNUSED |

32 BYTES

FIG.20

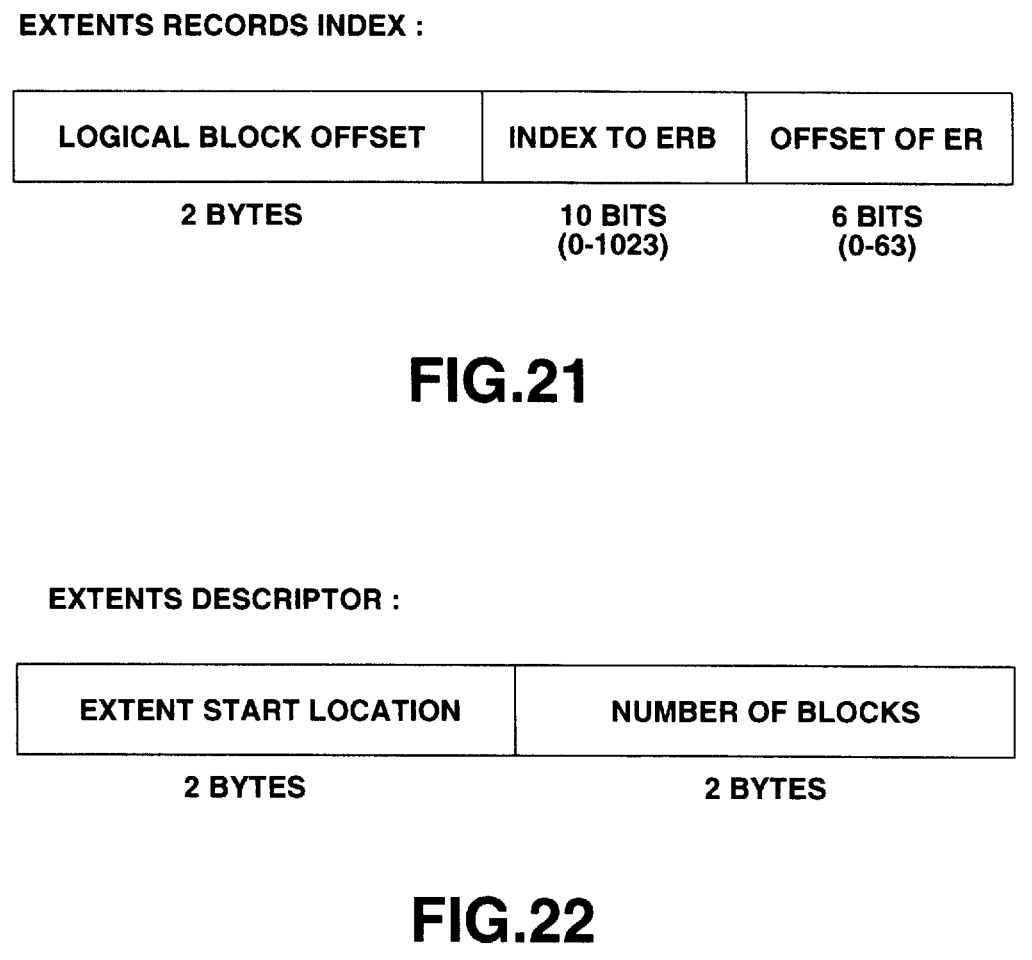

EXTENTS RECORDS INDEX :

| LOGICAL BLOCK OFFSET | INDEX TO ERB | OFFSET OF ER |
|---|---|---|
| 2 BYTES | 10 BITS (0-1023) | 6 BITS (0-63) |

FIG.21

EXTENTS DESCRIPTOR :

| EXTENT START LOCATION | NUMBER OF BLOCKS |
|---|---|
| 2 BYTES | 2 BYTES |

FIG.22

| | ← 16BIT | → | ← 16BIT | → | |
|---|---|---|---|---|---|
| | MSB LSB | MSB LSB | MSB LSB | MSB LSB | |
| HEADER | 00000000 | 11111111 | 11111111 | 11111111 | 0 |
| HEADER | 11111111 | 11111111 | 11111111 | 11111111 | 1 |
| HEADER | 11111111 | 11111111 | 11111111 | 00000000 | 2 |
| HEADER | CLUSTER | CLUSTER | 00000000 | 00000000 | 3 |
| | 00000000 | 00000000 | 00000000 | 00000000 | 4 |
| | 00000000 | 00000000 | 00000000 | 00000000 | 5 |
| | | | | | 6 |
| | | | FIRST TNO | LAST TNO | 7 |
| | | | | USED SECTORS | 8 |
| | | | | | 9 |
| | | | | | 10 |
| | DISC | ID | P-DFA | P-EMPTY | 11 |
| | P-FRA | P-TNO1 | P-TNO2 | P-TNO3 | 12 |
| | P-TNO4 | P-TNO5 | P-TNO6 | P-TNO7 | 13 |
| | ~ | ~ | ~ | ~ | |
| | P-TNO248 | P-TNO249 | P-TNO250 | P-TNO251 | 74 |
| | P-TNO252 | P-TNO253 | P-TNO254 | P-TNO255 | 75 |
| | | | | | 76 |
| | | | | | 77 |
| MANAGEMENT TABLE (255 PARTS TABLE) (01h) | START ADDRESS | | | TRACK MODE | 78 |
| | END ADDRESS | | | LINK INFORMATION | 79 |
| (02h) | START ADDRESS | | | TRACK MODE | 80 |
| | END ADDRESS | | | LINK INFORMATION | 81 |
| (03h) | START ADDRESS | | | TRACK MODE | 82 |
| | END ADDRESS | | | LINK INFORMATION | 83 |
| | ~ | | | ~ | |
| (FCh) | START ADDRESS | | | TRACK MODE | 500 |
| | END ADDRESS | | | LINK INFORMATION | 581 |
| (FDh) | START ADDRESS | | | TRACK MODE | 582 |
| | END ADDRESS | | | LINK INFORMATION | 583 |
| (FEh) | START ADDRESS | | | TRACK MODE | 584 |
| | END ADDRESS | | | LINK INFORMATION | 585 |
| (FFh) | START ADDRESS | | | TRACK MODE | 586 |
| | END ADDRESS | | | LINK INFORMATION | 587 |

FIG.24

BITMAP

2 BITS

| | | | | | | | | |
|---|---|---|---|---|---|---|---|---|
| 0 | 11 | 11 | 11 | 11 | 11 | 11 | 11 | 11 |
| 8 | 11 | 11 | 11 | 11 | 11 | 11 | 11 | 11 |
| 16 | 01 | 01 | 01 | 01 | 01 | 01 | 01 | 01 |
| 24 | 01 | 01 | 01 | 01 | 01 | 01 | 01 | 01 |
| 32 | 01 | 01 | 01 | 01 | 01 | 01 | 01 | 01 |
| 40 | 01 | 01 | 01 | 01 | 01 | 01 | 01 | 01 |
| 48 | 01 | 01 | 01 | 01 | 01 | 01 | 01 | 01 |
| 56 | 01 | 01 | 01 | 01 | 01 | 01 | 01 | 01 |
| 64 | 01 | 01 | 01 | 01 | 01 | 01 | 01 | 01 |
| 72 | 01 | 01 | 01 | 01 | 01 | 01 | 01 | 01 |
| 80 | 00 | 00 | 00 | 00 | 00 | 00 | 00 | 00 |
| 88 | 00 | 00 | 00 | 00 | 00 | 00 | 00 | 00 |
| 96 | 00 | 00 | 00 | 00 | 00 | 00 | 00 | 00 |
| 104 | 00 | 00 | 00 | 00 | 00 | 00 | 00 | 00 |
| 112 | 00 | 00 | 00 | 00 | 00 | 00 | 00 | 00 |
| | ⋮ | ⋮ | ⋮ | ⋮ | ⋮ | ⋮ | ⋮ | ⋮ |
| | 11 | 11 | 11 | 11 | 11 | 11 | 11 | 11 |

16 CLUSTERS (VMA)

50 CLUSTERS

00 AVAILABLE UNUSED BLOCK
01 USED BLOCK
10 DEFECTIVE BLOCK
11 DISABLED BLOCK

FIG.25

FLOW OF INITIALIZATION OF DATA TRACK

FLOW OF WRITING OF FILE

BITMAP

| | | | | | | | | |
|---|---|---|---|---|---|---|---|---|
| 0 | 11 | 11 | 11 | 11 | 11 | 11 | 11 | 11 |
| 8 | 11 | 11 | 11 | 11 | 11 | 11 | 11 | 11 |
| 16 | 01 | 01 | 01 | 01 | 01 | 01 | 01 | 01 |
| 24 | 01 | 01 | 01 | 01 | 01 | 01 | 01 | 01 |
| 32 | 01 | 01 | 01 | 01 | 01 | 01 | 01 | 01 |
| 40 | 01 | 01 | 01 | 01 | 01 | 01 | 01 | 01 |
| 48 | 01 | 01 | 01 | 01 | 01 | 01 | 01 | 01 |
| 56 | 01 | 01 | 01 | 01 | 01 | 01 | 01 | 01 |
| 64 | 01 | 01 | 01 | 01 | 01 | 01 | 01 | 01 |
| 72 | 01 | 01 | 01 | 01 | 01 | 01 | 01 | 01 |
| 80 | 01 | 01 | 01 | 01 | 01 | 01 | 01 | 01 |
| 88 | 01 | 01 | 00 | 00 | 00 | 00 | 00 | 00 |
| 96 | 00 | 00 | 00 | 00 | 00 | 00 | 00 | 00 |
| 104 | 00 | 00 | 00 | 00 | 00 | 00 | 00 | 00 |
| 112 | 00 | 00 | 00 | 00 | 00 | 00 | 00 | 00 |
| | ⋮ | ⋮ | ⋮ | ⋮ | ⋮ | ⋮ | ⋮ | ⋮ |
| | 11 | 11 | 11 | 11 | 11 | 11 | 11 | 11 |

16 CLUSTERS (VMA)

FIG.28

RECORDING MEDIUM MANAGEMENT METHOD WHERE RECORDING IS CARRIED OUT BY DATA RECORDING UNITS IN ACCORDANCE WITH MANAGEMENT TABLES

TECHNICAL FIELD

This invention relates to a recording medium management method suitable when used in the case of recording digital data to be processed by computer onto a magneto-optical disc on which digital audio data is primarily recorded in compressed manner, or reproducing it from such a magneto optical disc.

BACKGROUND ART

Recently, mini-discs (MD) (Tradename) using magneto-optical disc as recording medium, and adapted for compressing digital audio data to record compressed data thereonto and expanding such compressed data to reproduce therefrom data corresponding to original data have been being popularized. FIG. 29 shows a recording format in this mini-disc. As shown in this figure, one circumference of the mini-disc is divided into a plurality of sectors. One cluster is constituted by 36 sectors, and compressed digital audio data is recorded with this cluster being as unit.

In the case of mini-disc for recording, the leading three sectors of one cluster (=36 sectors) is caused to serve as a link sector, and the next one sector is caused to serve as sub data sector. To this sub data sector, sub data except for audio data is allocated. The link sector is caused to serve as an area for connecting clusters before and after, and audio data is recorded only in 32 sectors except for the link sector and the sub data sector.

On the other hand, in mini-disks dedicated to reproduction, data are continuously recorded (are not discretely recorded), and three sectors of the link area therefore become unnecessary. Accordingly, in this case, these three sectors are caused to also serve as sub data sector.

One sector consists of 2352 bytes (2332 bytes for data), and 11 sound groups are allocated to two successive sectors. One sound group consists of 424 bytes, and audio data of the left channel and the right channel are allocated thereto by 512 samples (11.61 ms) in total. Recording of digital audio data is carried out with the sound group being as unit.

It is conceivable to use such mini-disc as, e.g., storage unit of computer. In this case, in order to carry out management of data of computer as file, since cluster (36 sectors) is too large as unit, it is preferable to have ability of recording data in a unit (e.g., sector unit) smaller than cluster. However, as described above, since it is prescribed by the standardization requirements that mini-disc must record data thereonto with one cluster being as unit, there is the problem that it is unable to record data in a unit smaller than one cluster (e.g., sector unit).

Further, for example, in the case of recording both data of computer and audio data onto a mini-disc, it is conceivable to partition in advance the area for recording data similarly to recording in hard disc.

In the case where 2200 clusters from cluster 0 up to cluster 2199 exist on a mini-disc, as shown in FIG. 30, for example, the recording area is partitioned into area (A) from cluster 0 up to cluster 650, area (B) from cluster 651 up to cluster 1100, and area (C) from cluster 1101 up to cluster 2199, thus making it possible to record audio data into, e.g., partitions A and C of respective areas (partitions), and to record data of computer into partition B thereof.

However, in the case where the recording area is partitioned in advance in correspondence with kind of data in this way, when, e.g., data of computer to be recorded is above capacity of partition B, even if empty areas exist in the partition A and the partition C, data of computer is disadvantageously no longer recorded onto that mini-disc. In contrast, when partition A and partition C are filled with data, even if any empty area exists in the partition B, it is impossible to record audio data beyond that.

Further, management method of dividing the recording area into partitions in this way is management method basically different from the management method having cluster as unit. For example, when a mini-disc having a recording area divided into a plurality of partitions in which data of computer is recorded in a predetermined partition and audio data is recorded in any other partition is reproduced by an apparatus dedicated for reproducing audio data, there is the possibility that the audio data may not be reproduced. Namely, it becomes difficult to guarantee compatibility.

With such circumstances in view, this invention has been made, and makes it possible to record data in a unit of, e.g., sector smaller than cluster onto a mini-disc in which it is standardized to record data with cluster being as unit.

Further, in accordance with this invention, in the case where an empty area exists, it is possible to record both computer data and audio data at all times as occasion demands.

In addition, this invention makes it possible to ensure compatibility with ordinary mini-disc.

DISCLOSURE OF THE INVENTION

A recording medium management method of this invention is directed to a recording medium management method for carrying out management of recording state of digital data with respect to a recording medium (mini-disc 1 of FIG. 2, for example), characterized in that management of recording state onto a recording medium of digital data where recording/reproduction is carried out in a first unit (e.g., cluster) is carried out in accordance with a first table (e.g., management table of U-TOC in FIG. 3, for example) to designate a predetermined range from the range of the recording medium caused to undergo management in accordance with the first table to carry out recording/reproduction in a second unit (e.g., .sector) with respect to the designated range to carry out management of recording state onto the recording medium of digital data in the designated range in accordance with a second table (e.g., FAT of FIG. 7 or bitmap of FIG. 25).

In the recording medium management method thus featured, a predetermined range is designated from the range caused to undergo management by the management table of U-TOC, and the designated range is caused to undergo management by FAT. Accordingly, it is possible to record computer data in the designated range with sector smaller than cluster being as unit. Further, such designation is supplemented as occasion demands, thereby making it possible to supplementarily record not only digital audio data but also computer data as long as any empty area exists. In addition, compatibility with mini-disc on which only ordinary data is recorded is ensured.

BRIEF DESCRIPTION OF THE DRAWINGS

FIG. 3 is a view for explaining format of U-TOC of mini-disc 1 of FIG. 2.

FIG. 5 is a view for explaining the relationship between management table and data recording area.

FIG. 7 is a view for explaining FAT.

FIG. 8 is a view for explaining FAT in the state where computer data is recorded.

FIG. 14 is a view for explaining format of management table of FIG. 13.

FIG. 18 is a view for explaining format of directory record block entry of FIG. 13.

FIG. 19 is a view for explaining format of extent record block entry of FIG. 13.

FIG. 20 is a view showing an example of the configuration of extent record block of FIG. 13.

FIG. 21 is a view for explaining format of extent record index.

FIG. 22 is a view for explaining format of extent descriptor.

FIG. 24 is a view showing another example of the configuration of U-TOC.

FIG. 25 is a view for explaining the configuration of bitmap.

FIG. 28 is a view for explaining bitmap in the state where computer data is recorded.

BEST MODE FOR CARRYING OUT THE INVENTION

Figure 1:
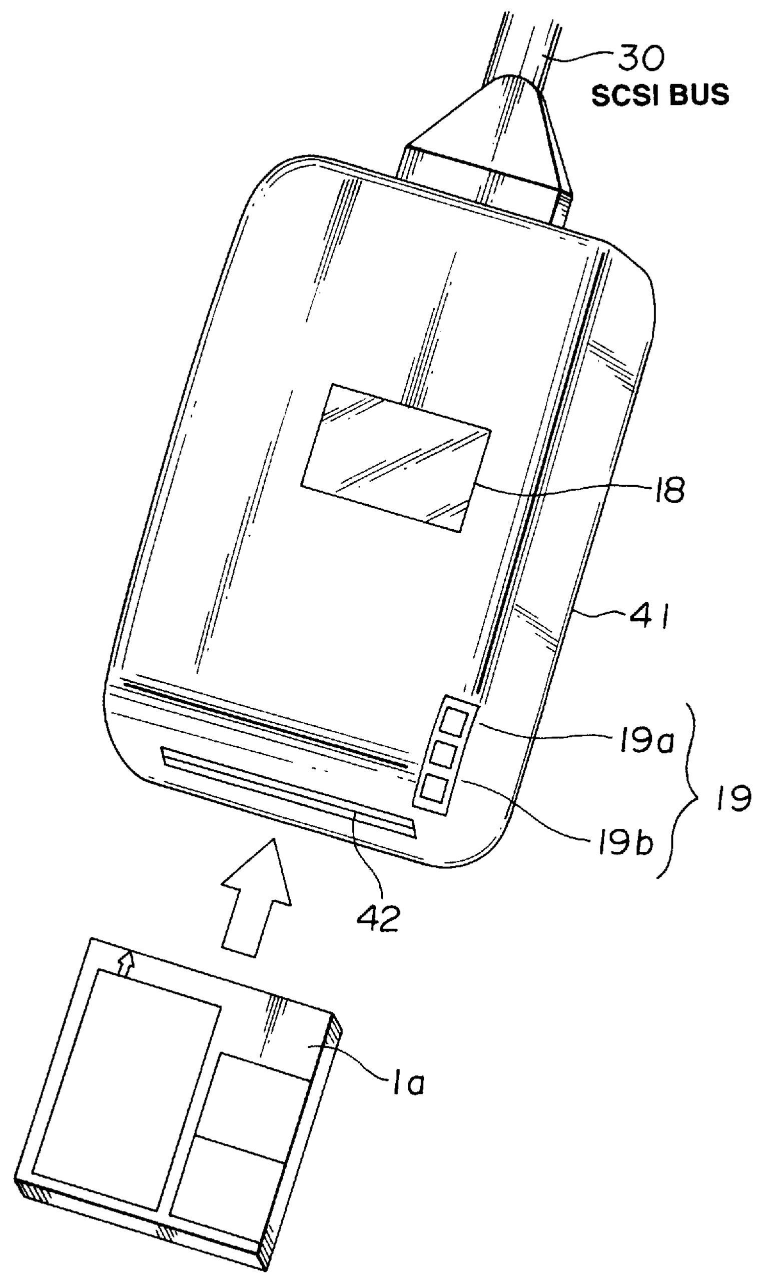
FIG. 1 is a view showing the configuration of appearance of a mini-disc device to which a recording medium management method of this invention is applied.

FIG. 1 shows the configuration of appearance of an embodiment of a mini-disc device to which a recording medium management method of this invention is applied. Within disc cartridge 1*a,* a mini-disc 1 (FIG. 2) is accommodated. This cartridge 1*a* is adapted so that it can be loaded into body 41 from opening for insertion designated at 42. At the bottom portion on the right side of body 41, an operation input section 19 including power switch 19 in the form of push-button and eject push-button 19*b*, etc. is provided. The power switch 19*a* is operated when the power supply is turned ON or OFF, and the eject push-button 19*b* is operated when cartridge 1*a* is ejected. Further, display section 18 is disposed at the central portion on the upper surface of body 41. The body 41 is connected to host CPU 31 (FIG. 2) through SCSI bus 30.

Figure 2:
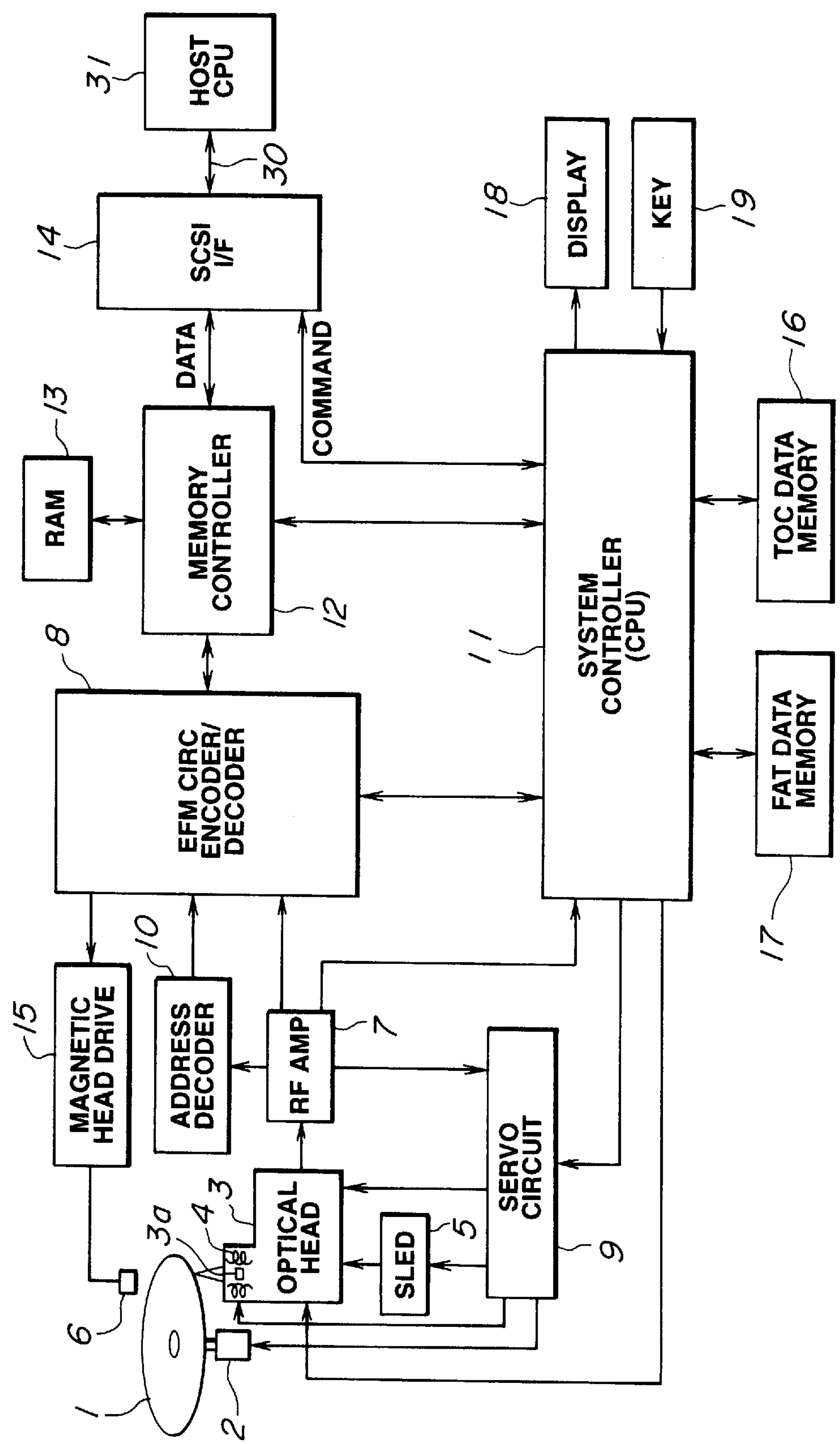
FIG. 2 is a block diagram showing internal configuration of body 41 of the embodiment of FIG. 1.

FIG. 2 shows the internal configuration of body 41. In this figure, mini-disc (magneto-optical disc) 1 on which, e.g., both a plurality of musical pieces (audio data) and computer data, or only computer data are or is recorded is rotationally driven by spindle motor 2. Optical head 3 irradiates laser beams to mini-disc 1 at the time of recording/reproduction. Namely, at the time of recording, laser beams of high level for heating recording tracks to Curie temperature are outputted. On the other hand, at the time of reproduction, laser beams of a relatively lower level for detecting data from a reflected light by the magnetic kerr effect are outputted.

For this reason, optical head 3 includes a laser diode for outputting laser beams, an optical system composed of a polarizing beam splitter, object lens (objective) and the like, and a detector for detecting a reflected light. Among these components, object lens 3*a* is held so that it can undergo displacement in a disc radial direction (tracking direction) and a direction in which it is in contact with the disc or is away therefrom (focus direction) by biaxial mechanism 4, and the entirety of optical head 3 can be moved in a disc radial direction by sled mechanism 5.

Further, magnetic head 6 is disposed at the position opposite to optical head 3 with mini-disc 1 being put between magnetic head 6 and optical head 3 so as to apply, to mini-disc 1, magnetic field modulated by data delivered to the magnetic head 6.

By the reproducing operation, information detected from mini-disc 1 by optical head 3 is delivered to RF amplifier 7. The RF amplifier 7 extracts, by operation processing of information delivered thereto, reproduction RF signal, tracking error signal, focus error signal, ATIP information (absolute time information recorded as pregroove (wobbling groove) on mini-disc 1), address information, sub code information, and focus monitor signal, etc.

The extracted reproduction RF signal is delivered to encoder/decoder section 8. Moreover, tracking error signal and focus error signal are delivered to servo circuit 9, and address information is delivered to address decoder 10. Further, ATIP information and focus monitor signal are delivered to system controller 11 comprised of, e.g., microcomputer (CPU).

The servo circuit 9 generates various servo drive signals by tracking error signal and focus error signal delivered from RF amplifier 7, and track jump command, seek command and rotational speed detection information, etc. from system controller 11 to control biaxial mechanism 4 and sled mechanism 5 to allow them to carry out focus and tracking controls, and to control spindle motor 2 so that it is driven at a constant angular velocity (CAV) or at a constant linear velocity (CLV).

Reproduction RF signal is EFM-demodulated at encoder/decoder section 8. The signal thus modulated is caused to undergo decode processing such as CIRC, etc., and is then once written into buffer RAM 13 by memory controller 12. In this case, reading of data from mini-disc 1 by optical head 3 and transfer of reproduction data from optical head 3 up to buffer RAM 13 are carried out at a transfer rate of 1.41M bits/sec.

Data written into buffer RAM13 is delivered to host CPU 31 through SCSI interface 14.

Address information outputted from address decoder 10 is delivered to system controller 11 through encoder/decoder section 8, at which it is used for various control operations.

Further, lock detection signal of PLL circuit for generating bit clock of recording/reproducing operation and signal for monitoring missing state of frame synchronizing signal of reproduction data are also delivered to system controller 11.

When recording operation is executed with respect to mini-disc 1, recording data is delivered to memory controller 12 through SCSI interface 14 by host CPU 31. This recording data is once written into buffer RAM 13 by memory controller 12, and is read out therefrom at a predetermined timing. The signal thus read out is sent to encoder/decoder section 8. At the encoder/decoder section 8, predetermined processing such as CIRC encode, EFM modulation, etc. are implemented thereto. The signal thus processed is delivered to magnetic head drive circuit 15.

The magnetic head drive circuit 15 delivers magnetic head drive signal to magnetic head 6 in dependency upon the recording data which has undergone encode and modulation processing, etc. Namely, mini-disc 1 is caused to execute application of magnetic field of N or S by magnetic head 6 with respect to mini-disc 1. At this time, system controller 11 delivers, to optical head 3, a control signal so as to output laser beams of recording level.

For example, on display section 18 comprised of liquid crystal display, a predetermined character, etc. is displayed in correspondence with command from system controller 11. The operation input section 19 includes reproduction key, stop key, AMS key and search key, etc. in addition to the above-described power switch 19*a,* eject push-button 19*b*, and inputs a signal corresponding to that operation to system controller 11.

RAM (hereinafter referred to as TOC memory) 16 holds TOC information in mini-disc 1. At the time point when mini-disc 1 is loaded, or immediately before recording or reproducing operation, system controller 11 drives spindle motor 2 and optical head 3 to extract data in TOC area set, e.g., on the innermost circumferential side of mini-disc 1. Then, TOC information delivered to system controller 11 through RF amplifier 7 and encoder/decoder section 8 is stored into TOC memory 16. After that, such information is used for control of recording/reproducing operation with respect to that mini-disc 1. Memory 17 stores FAT (File Allocation Table) information or bitmap which will be described later.

Host CPU 31 not only carries out control of transmission/reception of computer data, but also control transmission/reception of FAT information or bitmap, or updating of FAT information or bitmap. It is to be noted that memory 17 may be provided on the body 41 side.

On writable mini-disc 1, segment management data for permitting a series of musical pieces to be discretely (or continuously) recorded/reproduced as one segment (parts) or plural divided segments (parts) is further recorded. Namely, for management of recording data area user TOC (hereinafter referred to as U-TOC) such that the content is rewritten in accordance with recording or erasing of data is recorded in the form of data structure as shown in FIG. 3, for example.

This U-TOC is recorded in the area of, e.g., 4 bytes×587 within data area. In that area, header having synchronization patterns each comprised of 1 byte data of which respective bits are all 0 or all 1 are provided at the leading position in order that this area indicates U-TOC area.

Moreover, at predetermined address positions, data such as music number of the first musical piece (First TNO) and music number of the last musical piece (Last TNO), the use state of sector, and disc ID, etc. which are recorded on this mini-disc 1 are recorded. Further, there are prepared areas for recording various correspondence table indication data (P-DFA–P-TNO255) which allow respective musical pieces, etc. recorded to correspond to management table which will be described later.

On the other hand, 255 parts tables having numbers (01h)–(FFh) are provided as management table. In each parts table, there can be recorded start address serving as starting point with respect to a certain segment, end address serving as terminating point thereof, mode information of that segment (track), and link information in which when that segment is continuously connected to any other segment, it indicates parts table where start address and end address of the segment to be connected are recorded.

More particularly, mode information of track is information indicating whether or not that track is set to, e.g., overwrite protection or data copy protection, information indicating kind of audio information or computer information, etc., information indicating kind of monaural/stereo, and the like. Link information designates a parts table to be connected by, e.g., numbers (01h)–(FFh) given to respective parts tables.

Namely, in the management table, one parts table represents one segment. For example, with respect to the musical piece where three segments are connected, management of that segment position is carried out by three parts tables connected by link information. It is to be noted that, for the above reason, numbers (01h)–(FFh) of parts tables can be segment (parts) numbers as they are.

In respective parts tables of (01h)–(FFh) in the management table, the content of that segment is indicated by correspondence table indication data (P-DFA–P-TNO255).

P-DFA indicates defective area on mini-disc 1, i.e., designates one parts table or the leading parts table within plural parts tables where track portion (=segment) serving as defective area due to flaw is indicated. Namely, in the case where any defective segment exists, any one of (01h)–(FFh) is recorded into the area of correspondence table indication data P-DFA, and defective segment is indicated by start and end addresses in parts table corresponding thereto. Moreover, in the case where any other defective segment exists, corresponding other parts table is designated as link information in that parts table, and defective segment is indicated also in that parts table. Further, in the case where that segment is the last defective segment, link information is caused to be, e.g., (00h), and it is indicated that no segment is linked in areas succeeding thereto.

P-EMPTY indicates one unused parts table or the leading parts table of plural parts tables in the management table. In the case where any unused parts table exists, any one of (01h)–(FFh) is recorded as correspondence table indication data P-EMPTY. In the case where a plurality of unused parts tables exist, parts tables are sequentially designated by link information from part table designated by correspondence table indication data P-EMPTY. Thus, all unused parts table are connected (linked) on the management table. For example, in the case of the magneto-optical disc on which no data is recorded and there is no defective, all parts tables are not used. For this reason, connection to parts table (FFh) is carried out such that, e.g., parts table (01h) is designated by correspondence table indication data P-EMPTY, parts table (02h) is designated as link information of parts table (01h), and parts table (03h) is designated as link information of parts table (02h). In this case, link information of parts table (FFh) is caused to be (00h) indicating that there is no connection at areas succeeding thereto.

P-FRA indicates a unrecorded area (including erase area) of data on mini-disc 1, and designates one parts table or the leading parts table within plural parts tables where track portion (segment) serving as unrecorded area is indicated. Namely, in the case where any unrecorded area exists, any one of (01h)–(FFh) is recorded in the area of correspondence table indication data P-FRA. In a parts table corresponding thereto, segment serving as a unrecorded area is indicated by start address and end address. In addition, in the case where there are a plurality of segments described above, i.e., there are a plurality of parts tables, designation up to the parts table where link information is caused to be (00h) by is sequentially carried out link information.

Figure 4:
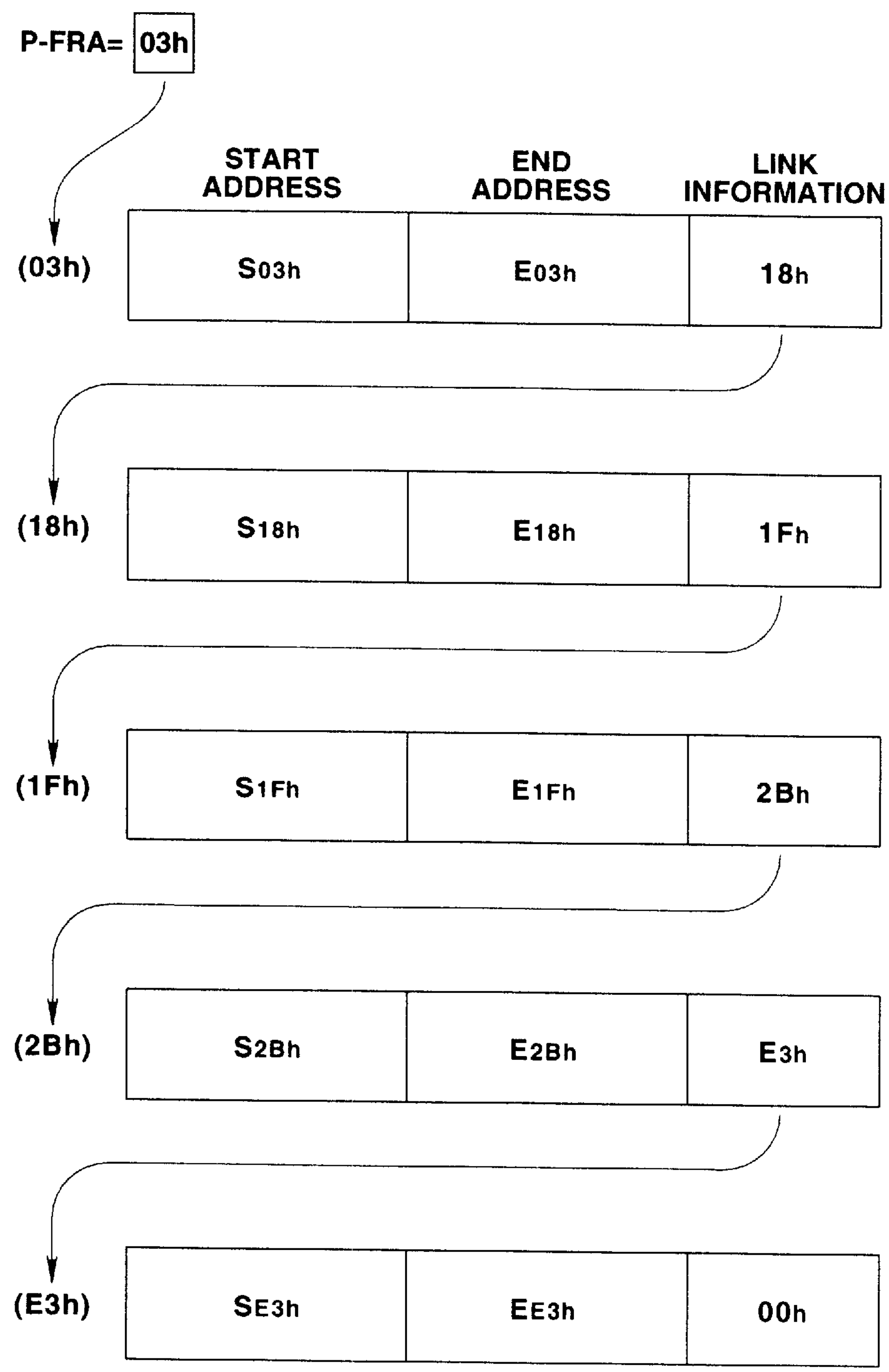
FIG. 4 is a view for explaining link of management table of FIG. 3.

Management state by parts table of segment serving as unrecorded area is shown in a model form in FIG. 4. Namely, FIG. 4 shows the state where when segments where start addresses and end addresses are respectively indicated by ($S_{03h}$, $E_{03h}$), ($S_{18h}$, $E_{18h}$), ($S_{1Fh}$, $E_{1Fh}$), ($S_{2Bh}$, $E_{2Bh}$), ($S_{E3h}$, $E_{E3h}$) are caused to be unrecorded area, such segment unrecorded area arrangement state is represented, subsequently to correspondence table indication data P-FRA, by link of parts tables (03h), (18h), (1Fh), (2Bh), (E3h). It is to be noted that management mode of defective area and/or unused parts table described above are the same as the state shown in FIG. 4.

P-TNO1–P-TNO255 indicate areas with respect to respective musical pieces (tracks) recorded on mini-disc 1. For example, correspondence table indication data P-TNO1 designates parts table in which one segment or the leading segment in point of time of plural segments where data of the first musical piece is recorded.

In the case where, for example, musical piece which has been selected as the first musical piece is recorded without being divided (i.e., by one segment) on disc, recording area of the first musical piece is recorded as start and end addresses in the parts table indicated by correspondence table indication data P-TNO1.

Moreover, in the case where, e.g., musical piece which has been selected as the second musical piece is recorded discretely in a plurality of segments on disc, respective segments are designated (linked) in accordance with order in point of time for the purpose of indicating the position of that musical piece. Namely, other parts tables are further sequentially designated in accordance with order in point of time by link information from parts table designated by correspondence table indication data P-TNO2, and connection up to parts table where link information is caused to be (00h) is carried out (the same mode as that of FIG. 4).

As stated above, all segments where data constituting, e.g., the second musical piece are sequentially designated and stored, whereby in carrying out reproduction of the second musical piece or overwrite into the area of the second musical piece by using this U-TOC data, optical head 3 and magnetic head 6 are caused to be accessed, thereby making it possible to take out continuous music information from discrete segments, or to carry out recording efficiently using the recording area.

As stated above, U-TOC data recorded on mini-disc 1 is read out and is stored into TOC memory 16. U-TOC data which has been read into TOC memory 16 is used to carry out management of the recording area on disc, thus making it possible to control the recording/reproducing operation.

The above-mentioned U-TOC data is also recorded similarly as in the case of mini-disc. on which ordinary musical pieces are recorded. In the mini-disc of this embodiment, in order to have ability of recording, e.g., computer data except for audio data (musical piece), LOFAT (Location of FAT) is recorded as data of 16 bits. This LOFAT will be described later.

FIG. 5 shows, in a model form, the relationship between management table (parts table) of U-TOC and cluster of data recording area of mini-disc 1. This example indicates unrecorded area of data on mini-disc 1. Parts table No. indicating the leading cluster of the unrecorded area is prescribed as (01h) in correspondence table indication data P-FRA. Namely, position of the leading segment as unrecorded area of data is described in parts table (01h).

When reference is made to parts table of this number (01h), its start address is caused to be cluster 9, and end address is caused to be cluster 12. From this fact, it is seen that cluster 9 to cluster 12 of the data recording area are caused to be continuously unrecorded area. (0Ah) is described as link information in the parts table of this number (01h). This indicates that data relating to segments of unrecorded areas subsequent to class 9 to cluster 12 is described in the parts table of number (0Ah).

When attention is drawn to the parts table of number (0Ah), its start address is caused to be cluster 29, and its end address is caused to be cluster 30. Namely, it is seen that segment from cluster 29 to cluster 30 exists as unrecorded area in the data recording area.

Moreover, (04h) is described as link information of this number (0Ah). When attention is drawn to parts table of the number of (04h), its start address is caused to be cluster 104 and its end address is caused to be cluster 105. Namely, it is seen that unrecorded area consisting of clusters 104 and 105 exists as the third segment subsequent to cluster 29 and cluster 30.

Further, link information of (07h) is described in the parts table of (04h). When attention is drawn to parts table of (07h), its start address is caused to be cluster 82 and its end address is caused to be cluster 87. Namely, the forth segment from cluster 82 to cluster 87 is caused to be unrecorded area. Since (00h) is described in link information of this parts table of (07h), it is seen that the fourth segment is the last segment of the unrecorded area.

As described above, digital audio data is basically recorded in respective clusters of the data recording area. However, in the case of recording computer data into a predetermined range (cluster) in place of digital audio data, the range for recording computer data is first designated with cluster being as unit by host CPU31, as shown in FIG. 6, for example.

Figure 6:
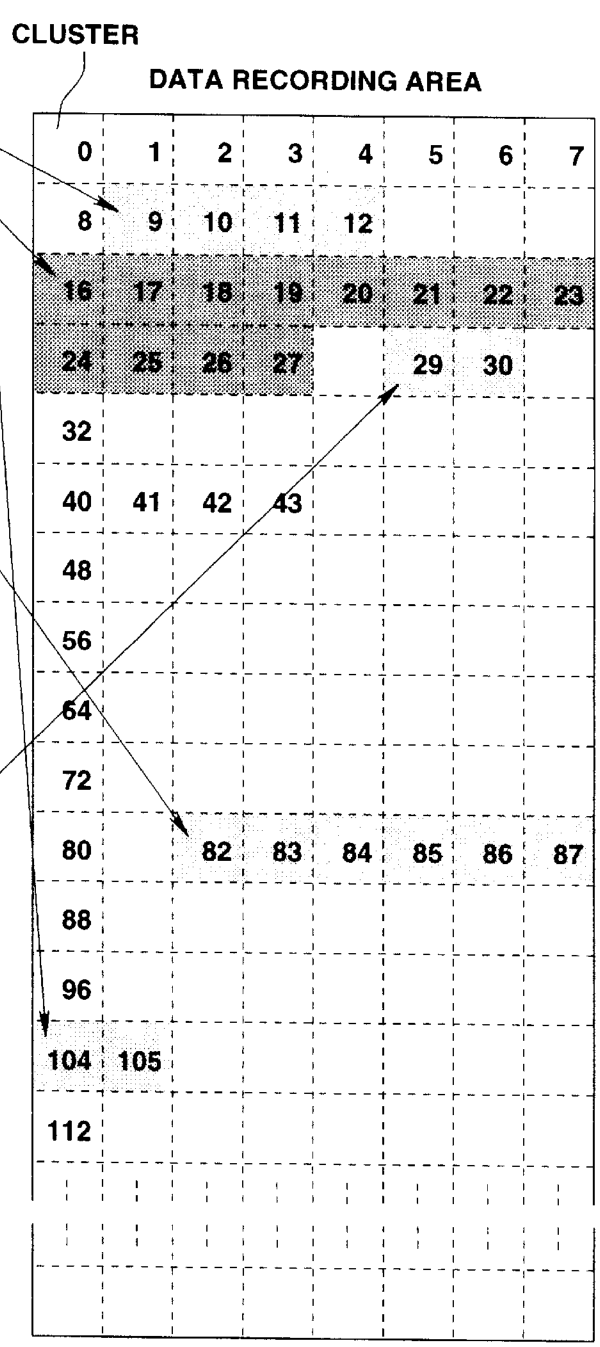
FIG. 6 is a view for explaining the relationship between management table and data recording area when the area for recording computer data is ensured.

In the example of FIG. 6, segment consisting of 12 clusters from cluster 16 to cluster 27 is designated as segment for recording computer data. Since this segment is the fifth segment, (02h) is described as number of parts table relating to the leading segment for recording computer data in the correspondence table indication data P-TNO5 of the above-described U-TOC. When attention is drawn to the parts table of (02h), cluster 16 is described as start address, and cluster 27 is described as end address. Since (00h) is described as link information, it is seen that only one segment consisting of 12 clusters from cluster 16 to cluster 27 is prepared as segment for recording computer data.

When the area for recording computer data is designated in the management table (parts table) in this way, FAT as table for carrying out management of file for recording computer data as shown in FIG. 7 is formed at a predetermined track of the data recording area on mini-disc 1. As shown in FIG. 6, for example, FAT is recorded into the leading cluster 16 of the area for recording computer data of cluster 16 to cluster 27 (It is of course that FAT may be recorded into, e.g., U-TOC area). At this time, (02h) is described at LOFAT in order that recording position of FAT can be seen.

One block of FAT consists of 2 bytes. Respective blocks correspond to the area of predetermined size (e.g., cluster) of the data recording area. Namely, in the example shown in FIG. 6, since segment from clusters 16 to 27 in the data recording area is designated as computer data recording area, (FFEh) indicating available unused block is described in blocks 17 to 27 corresponding to these clusters 16 to 27. It is to be noted that when FAT is recorded in cluster 16, (FFDh) is recorded in block 16 of FAT corresponding to this cluster. This indicates that data is recorded at that portion (corresponding cluster 16), and that data terminates at that portion (corresponding cluster 16).

Since respective clusters except for clusters 16 to 27 of the data recording area are not designated as the area for recording computer data, in other words, it is inhibited to use such cluster area as the area for recording computer data, data (FFFh) indicating disabled block is described.

FIG. 8 shows FAT in the state where computer data is recorded in a predetermined range of clusters 16 to 27 thus ensured. In this example, No. of block 18 is described in block 17 corresponding to cluster 17, No. of block 19 is described in block 18, No. of block 20 is described in block 19, and data (FFDh) indicating the last block of segment is described in block 20. Accordingly, it is seen that a series of computer data are recorded in the segment consisting of four clusters from cluster 17 to cluster 20.

Further, block No. 22 is described in block 21, block No. 23 is described in block 22, block No. 24 is described in block 23, block No. 25 is described in block 24, and (FFDh) is described in block 25. Namely, a series of computer data are recorded in five clusters from cluster 21 to cluster 25.

It is to be noted that since data of blocks 26 and 27 remain to be (FFEh), clusters 26 and 27 remains to be unused area where computer data is not yet recorded.

Figure 9:
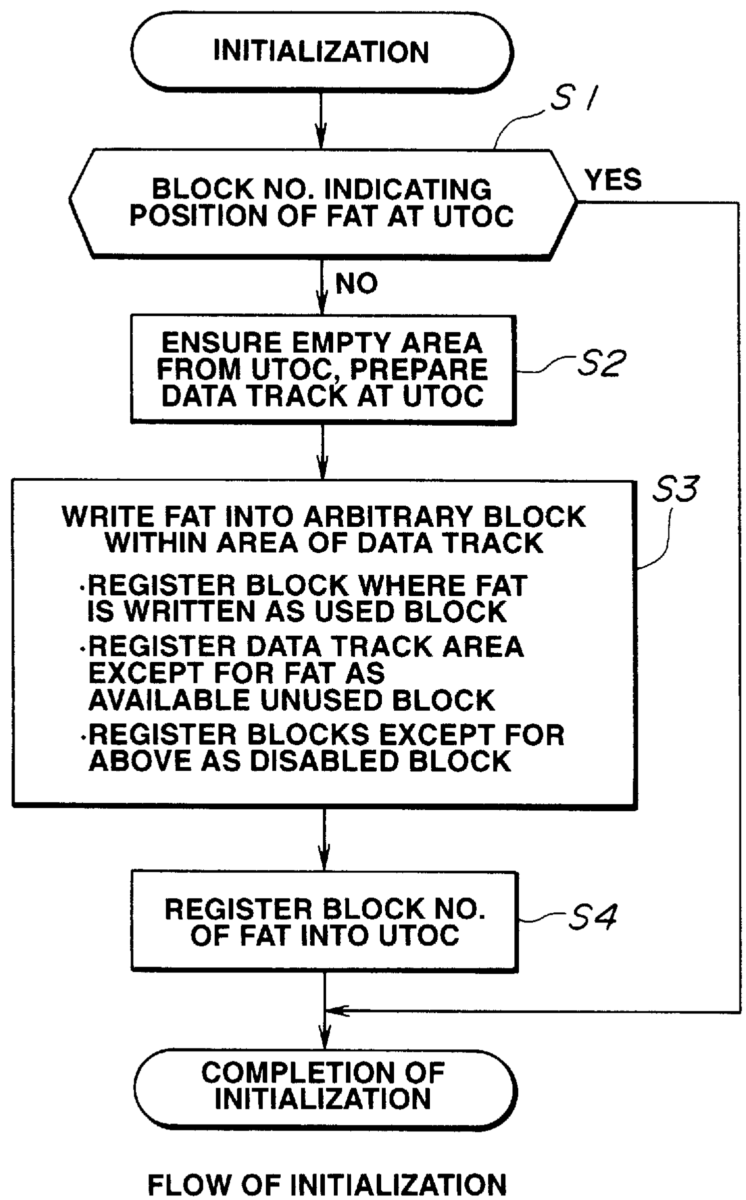
FIG. 9 is a flowchart for explaining the operation for initializing mini-disc 1 in the embodiment of FIG. 2.

FIG. 9 shows an example of processing carried out by host CPU 31 when mini-disc 1 (cartridge 1*a*) is loaded into body 41 of mini-disc device for carrying out recording/reproduction of computer data to instruct initialization. Initially, at step S1, whether or not No. indicating parts table on a predetermined management table is described in LOFAT of U-TOC of mini-disc 1 is judged. In the case where No. of a predetermined pats table is described in LOFAT, since initialization for recording computer data has been already completed (recording area is ensured), initialization processing is completed.

At step S1, in the case where it is judged that a predetermined number is not described in LOFAT, the processing proceeds to step S2. Thus, empty area (empty parts table) is ensured from U-TOC (data track is ensured). As shown in FIG. 6, for example, predetermined 12 clusters (12 clusters from cluster 16 to cluster 27 in FIG. 6) are ensured as computer data recording track from empty areas in the data recording area (whether or not a corresponding area is an empty area can be recognized from P-TNO1–P-TNO 255 of U-TOC). Then, this segment is registered into P-TNO5, and its start address and its end address are registered into pars table (02h).

Then, the processing proceeds to step S3. At this step, FAT as shown in FIG. 7 is written into an arbitrary cluster (e.g., the leading cluster 16) of (12 clusters) within the area of data track ensured at step S2. In FAT, data (FFDh) indicating used block and having no block to be linked is recorded into block 16 corresponding to cluster 16 into which FAT is written. Moreover, data (FFEh) is recorded as available unused block into blocks 17 to 27 of FAT corresponding to clusters 17 to 27 where no FAT is recorded. In addition, data (FFFh) is recorded as disabled block into blocks of FAT corresponding to clusters except for the above.

Then, the processing proceeds to step S4. At this step, No. of parts table corresponding to cluster where FAT is recorded is described in LOFAT of U-TOC.

It is to be noted that FAT data is temporarily stored into memory 17, and is recorded into FAT on mini-disc 1 at a predetermined timing.

Figure 10:
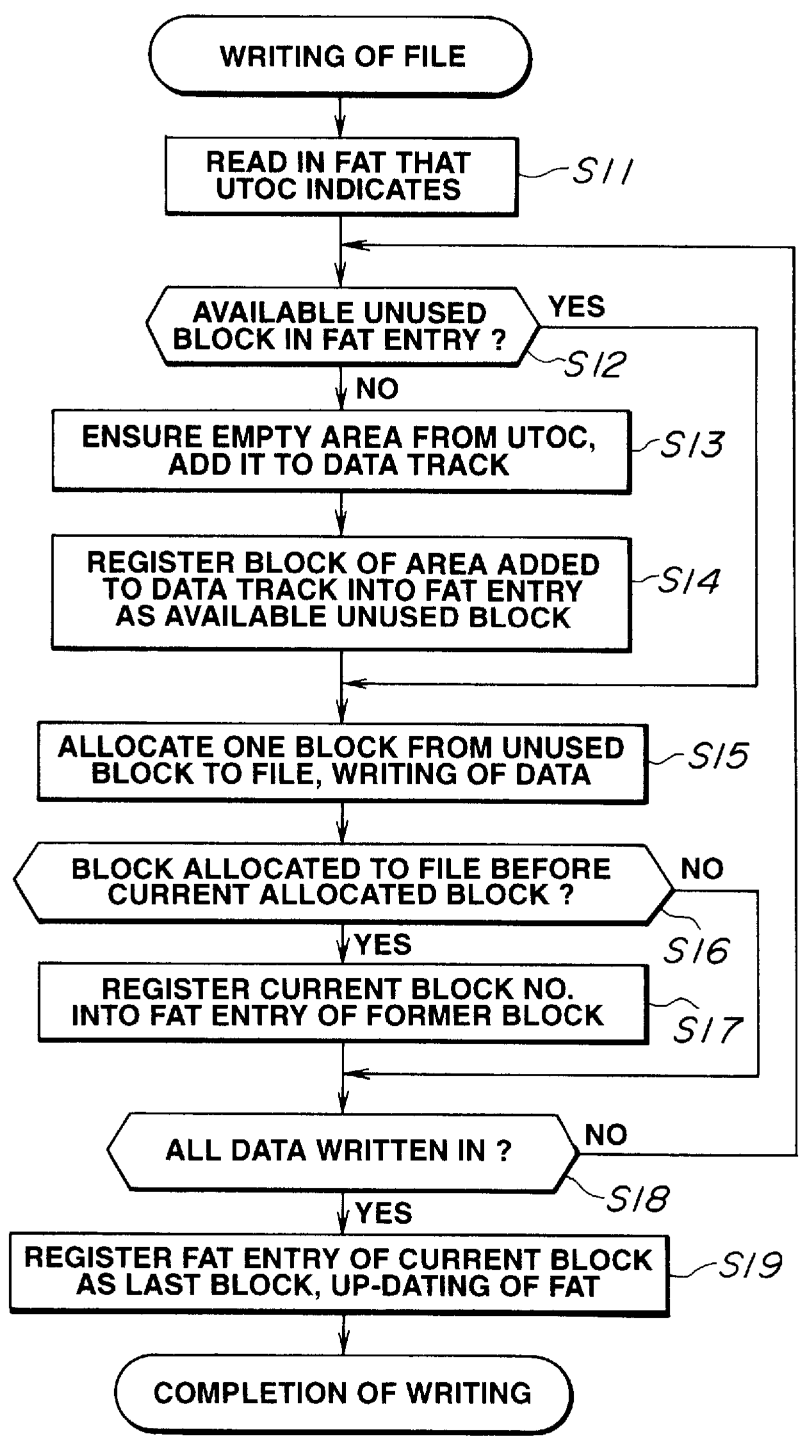
FIG. 10 is a view for explaining the operation in the case where computer data is recorded onto mini-disc 1 in the embodiment of FIG. 2.

FIG. 10 shows an example of processing executed by host CPU 31 in the case where computer data is recorded onto mini-disc 1. Initially, at step S11, host CPU 31 reads in FAT that LOFAT of U-TOC indicates (FAT of cluster 16 of the data recording area of FIG. 6) recorded on mini-disc 1. This data is temporarily stored into memory 17, and CPU 31 reads in this data at a predetermined timing.

Then, the processing proceeds to step S12. At this step, whether or not there is available unused block in the entry of FAT which has been currently read in is judged. In the case of initially recording computer data, since available unused block exists, the processing proceeds from step S12 to step S15. At the step S15, one block (e.g., block 17 of FAT of FIG. 8) is selected from unused blocks. The block thus selected is caused to correspond to file into which data is to be written. Then, data is actually written into cluster to which that block corresponds (e.g., cluster 17 of the data recording area of FIG. 6).

Then, the processing proceeds to step S16. At this step, whether or not block allocated to corresponding file exists before the block currently allocated is judged. In the case of initial recording, since block allocated earlier does not exist, the processing proceeds from step S16 to step S18. At the step S18, whether or not writing of all data has been completed is judged. As a result, if such writing operation is not completed, the processing returns to step S12.

Such an operation is repeated. At the second processing and processing subsequent thereto, it is judged at step S16 that block earlier allocated to the file exists. For this reason, in this case, the processing proceeds from step S16 to step S17 to register current block No. into entry of FAT of the former block. Namely, as explained with reference to FIG. 8, current block No. 18 is registered into, e.g., block 17. Similarly, block No. 19 is recorded into block 18 and block No. 20 is recorded into block 19.

In the case where the ensured area is filled as the result of repetition of the above-mentioned operation and it is judged at step S12 that available unused block dose not exist in entry of FAT, i.e., when there is no empty area for recording computer data, the processing proceeds to step S13 to ensure an empty area of U-TOC to supplement that empty area as data track for recording computer data. Then, the processing proceeds to step S14 to register, as available unused block, block of area supplemented as data track into entry of FAT. Namely, processing similar to steps S2, S3 in the initialization processing of FIG. 9 is carried out to newly ensure (supplement) data recording area of 12 clusters. It is to be noted that since FAT has been already prepared, only data corresponding thereto is updated without newly preparing FAT.

By carrying out processing of these steps S13, S14, empty area on mini-disc 1 is supplemented upon occasion as data track for recording computer data. Accordingly, occurrence of an unfavorable phenomenon such that it becomes unable to record computer data although any empty area exists on the disc as in the case where a predetermined range is partitioned in advance as partition can be prevented.

In the case where it is judged at step S18 that writing of all data has been completed, the processing proceeds to step S19 to register FAT entry of current block as the last block to update FAT. Namely, as in the case of block 20 of FAT of FIG. 8, data (FFDh) is recorded into the block.

It is to be noted that while numbers (01h)–(FFh) of parts table are described in LOFAT, since 16 bits are ensured for LOFAT, address in the data recording area may be directly recorded.

Assuming now that when the number of clusters of the entirety of the area of mini-disc 1 is 2200 and capacity of one cluster is 64k bytes, capacity of the entirety of mini-disc 1 becomes equal to 140M bytes (=2200×64k bytes).

If the range of 8k bytes of recording data area is caused to correspond to one block of FAT, 17,600 (=140M bytes/8k bytes) blocks are required as the number of blocks (the number of entries) of FAT. When one entry (block) is formed by 2 bytes (16 bits), about 35k bytes (=17,600×2 bytes) is required as capacity of FAT. Eventually, when 8k bytes (the range which is one eighth of 64k bytes which is one cluster) in the data recording area are caused to correspond to one block of FAT, FAT having capacity of 35k bytes is required in order to carry out management of the range of the entirety of one disc.

A quantity of allocation of one block of FAT serves as unit of data recording. As described above, if this quantity of allocation is 64k bytes (1 cluster), writing similar to that of the ordinary mini-disc can be carried out. However, when an attempt is made to sufficiently transfer computer data, it is preferable that the quantity of allocation is about 8k bytes smaller than 64k bytes. In addition, when such a scheme is employed, recording of data can be made in a unit smaller than cluster.

It is to be noted that in the case of recording data in unit of 8k bytes, data of one cluster including block of 8k bytes is once read out from mini-disc 1, and is stored into RAM 13. Then, data corresponding to 8k bytes of data of one cluster stored in RAM 13 is newly stored. Data of 1 cluster is written onto mini-disc 1. Namely, recording of only data of substantially 8k bytes is carried out. Further, at the time of reproduction, host CPU 31 reads data in one sector unit.

In the case where a mini-disc recorded so that computer data (of course, other data may be employed) exists mixedly with audio data is loaded on a mini-disc device for ordinary musical pieces, computer data cannot be reproduced, but audio data can be reproduced. If there is any empty area, it is possible to supplementarily record audio data.

While management of data track is carried out by using FAT in the above-described embodiment, an embodiment in which management of data track is carried out by using no FAT will now be described.

Figure 11:
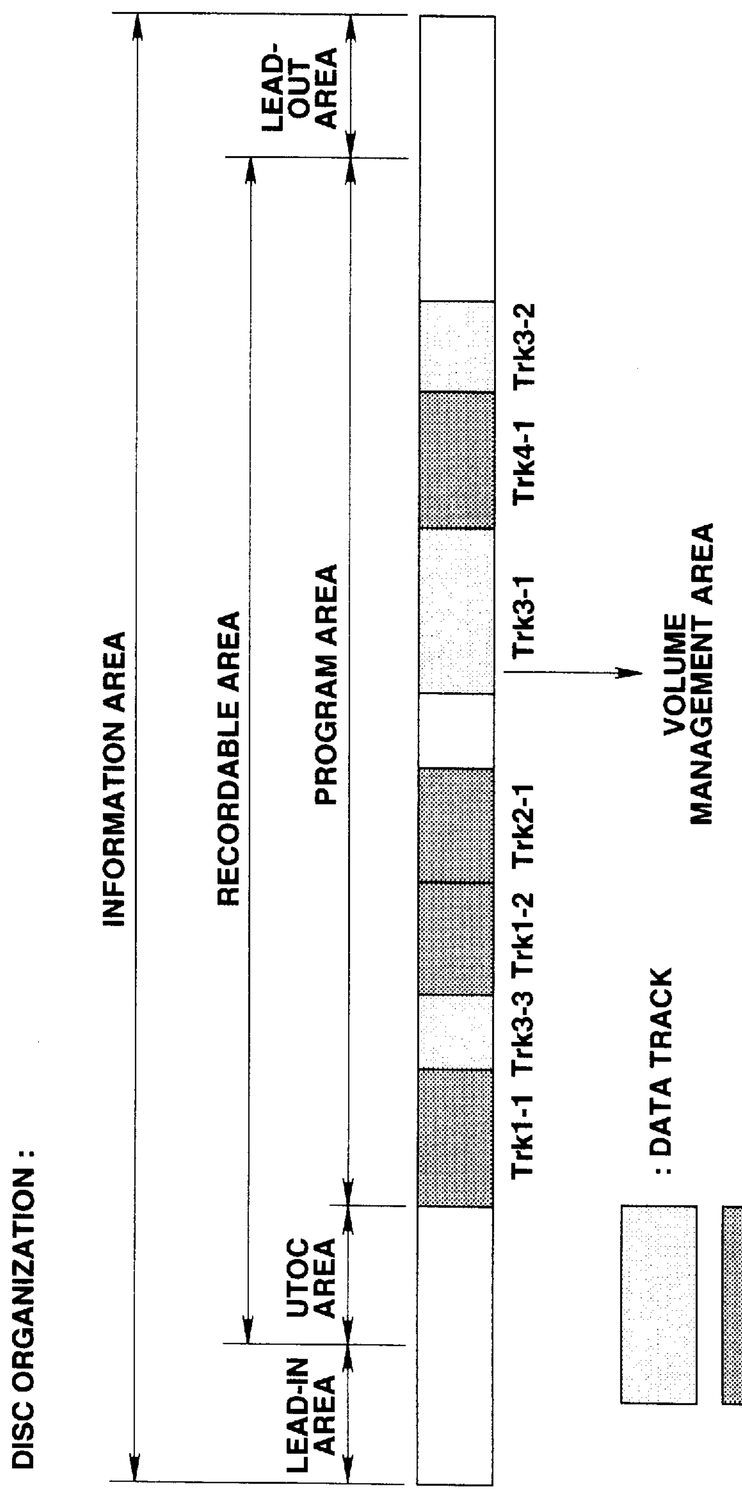
FIG. 11 is a view for explaining format of mini-disc 1 in another embodiment of the recording medium management method of this invention.

FIG. 11 shows a recording format of writable mini-disc 1 in the case where this embodiment is realized. As shown in this figure, on the innermost circumferential side and the outermost circumferential side from the innermost circumference (left side in the figure) to the outermost circumference (right side in the figure), Lead-in area and Lead-out area are respectively provided. TOC (Table of Contents) data, etc. is recorded as occasion demands; into the Lead-in area and the Lead-out area. General user cannot record information into these areas.

The area except for Lead-in area and Lead-out area of information area is caused to be recordable area, and general user can record data into the recordable area or reproduce it therefrom. On the innermost circumferential side of the recordable area, UTOC (User TOC) area is provided. Outside that area, program area is provided. Into the UTOC area, the above-mentioned U-TOC data is recorded. In the program area, audio data, data processed in computer, or other data can be recorded.

In the program area, respective data are discretely recorded. In the example of FIG. 11, audio data is recorded on track Trk1. Namely, this track is caused to be audio track. This track Trk1 consists of two parts (Trk1-1, Trk1-2). Parts (tracks) Trk1-1 and Trk1-2 are formed at the position away from each other on the disc. For example, when that data is reproduced, optical head 3 seeks parts Trk1-2 when reproduction of parts Trk1-1 is completed to reproduce it. For this reason, reproduction data can be continuously obtained.

In this example, in addition to the above-mentioned feature, audio tracks Trk2-1 and Trk4-1 are respectively comprised of one parts, and audio data are recorded thereinto.

Further, in this embodiment, track Trk3 consisting of parts Trk3-1 to 3-3 is formed, and data processed by host CPU 31 is recorded thereonto.

EFM.CIRC encoder/decoder 8 carries out processing so that data is recorded and reproduced with cluster (64k bytes) being as unit with respect to respective tracks of the program area.

Data track consists of Volume Management Area and Extent Area. Volume Management Area is formed at the leading portion of data track initially formed in the program area. Extent Area is caused to be an area except for the above.

Individual managements of Allocation Block of Volume Management Area and Extent Area are carried out. The former is caused to have 2k bytes, and the latter is caused to have any one (e.g., 8k bytes) of 4k bytes, 8k bytes, 16k bytes, 32k bytes and 64k bytes.

Figure 12:
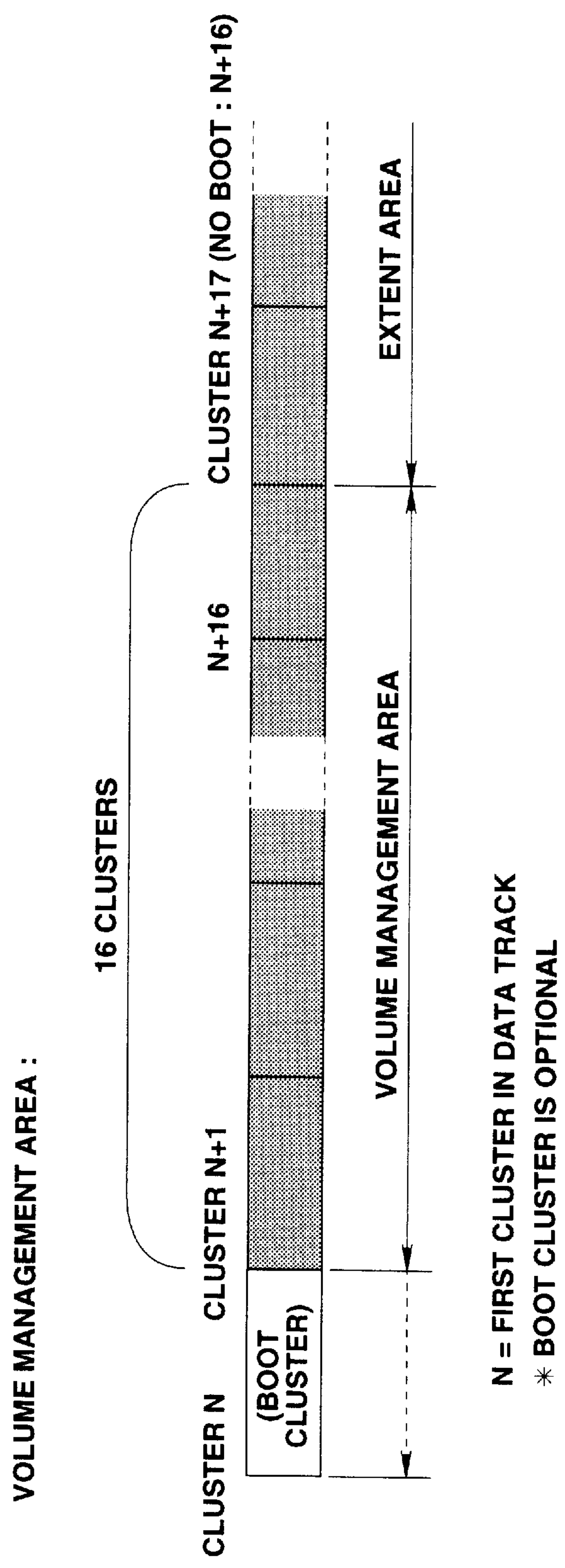
FIG. 12 is a view for explaining format of data track of FIG. 11.

Volume Management Area consists of 16 clusters as shown in FIG. 12. Before one cluster of Volume Management Area, Boot Cluster is allocated as occasion demands.

Figure 13:
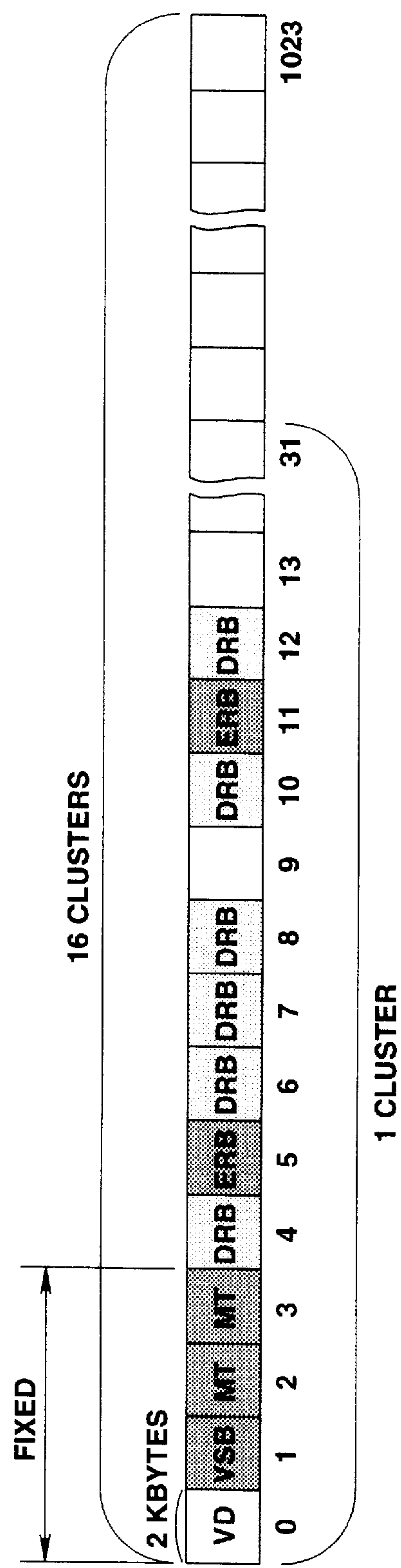
FIG. 13 is a view for explaining format of volume management area of FIG. 12.

FIG. 13 shows a format of the Volume Management Area. This Volume Management Area consists of 16 clusters and one cluster consists of 64k bytes. For this reason, 1024 blocks of 2k bytes are formed in the Volume Management Area.

In the first block of number 0, VD (Volume Descriptor) is recorded. In this Volume Descriptor, e.g., number of blocks where root directory is recorded (any one of 0 to 1023 (4 in the case of this example)) and/or position information of volume space bit map, etc. are recorded.

In the block of No. 1, Volume Space Bitmap (VSB) is allocated. In the VSB, bitmap indicating the use state of the entirety of mini-disc 1 is recorded. This bitmap will be described later.

Management Table (MT) is allocated to the block of 4 bytes in total of No. 2 and No. 3. Use state of the Volume Management Area is recorded in MT.

FIG. 14 shows, in a model form, Management Table consisting of two blocks of No. 2 and No. 3. As shown in the figure, respective blocks having capacity (volume) of 4 bytes indicated by numbers 0 to 1023 correspond to block of 2k bytes indicated by numbers of blocks of 0 to 1023 in FIG. 13. In FIG. 13, since blocks of numbers 0 to 3 are prescribed in advance by standardization requirement, data is not particularly recorded (is caused to be reserved) in the corresponding area (block) on the Management Table of FIG. 14.

As shown in FIG. 13, Directory Records Blocks (DRB) or Extent Records Blocks (ERB) are allocated to the No. 4 block and blocks succeeding thereto.

In the Directory Records Block DRB, the following information (directory management information and file management information) are recorded:

Directory (Name, Index to DRB, ID, Size, Date, etc.)

File (Name, Index to ER (Index to ERB, Offset of ER), Extent start Location, Number of Blocks, ID, Size, Date, etc.)

Directory Records Block Entry of Management Table for recording data of the Directory Records Block DRB is constructed as shown in FIG. 15 or FIGS. 16 to 18.

Figure 15:
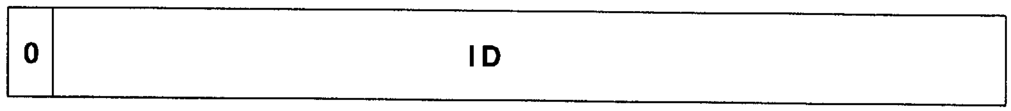
FIG. 15 is a view for explaining format of directory record block entry of FIG. 13.

The format shown in FIG. 15 indicates format in the case where Directory Records Block Entry consists of only one DRB. In this case, 0 is set to the first bit 31 of data of 4 bytes, and ID is recorded in the remaining 31 bits from bit 30 to bit 0. For example, Directory Record Block Entry corresponding to block of number 4 of FIG. 14 is constituted with this format. In the case of this example, 00000002 is recorded as ID. This ID indicates route directory.

Figure 16:
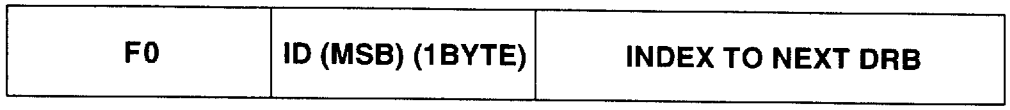
FIG. 16 is a view for explaining format of directory record block entry of FIG. 13.
Figure 17:
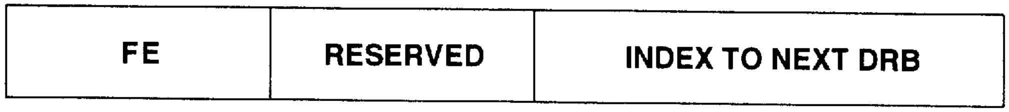
FIG. 17 is a view for explaining format of directory record block entry of FIG. 13.

In the case where Directory Records Block DRB consists of a plurality of blocks, the first directory records block entry is constituted with format as shown in FIG. 16, the last entry is constituted with format as shown in FIG. 18, and the entry therebetween is constituted with format as shown in FIG. 17.

In the format of FIG. 16, FO is recorded into the first 1 byte, and ID of 1 bite on the MSB side of ID of 4 bytes is recorded into the next 1 byte. Index to Next DRB is allocated to the next 2 bytes.

In the entry of FIG. 17, FE is allocated to the first 1 byte and the next 1 byte is reserved (unused). Index to Next DRB is allocated to the remaining two bytes.

In the entry of FIG. 18, FF is allocated to the first 1 byte, and ID of the remaining 3 bytes except for MSB of 1 byte recorded at the second byte of FIG. 16 is recorded at the remaining 3 bytes.

Entries indicated by No. 7, No. 8 and No. 10 of FIG. 14 are prescribed by the format shown in FIG. 16, 17 or 18. 0008 is recorded into the last 2 bytes of the entry corresponding to block No. 7. This indicates that the next DRB where related data is recorded is Directory Records Block DRB indicated by No. 8. Moreover, 000A (hexadecimal number) is recorded at the last 2 bytes of the entry of the block corresponding to No. 8. This indicates that Directory Record Blocks of No. 10 (value by decimal notation corresponding to A of hexadecimal number) are successive.

In addition, 00 is recorded at the second byte of No. 7. It is seen that since ID of 000005 is recorded at the entry corresponding to the block of No. 10, ID of directory prescribed by these three blocks is eventually 00000005.

FIG. 19 shows format of Extent Records Block Entry of the Management Table of FIG. 14. In this format, 80 is allocated to the first 1 byte, the remaining two bytes are reserved (unused), and Used Count is allocated to the last 1 byte. This used count indicates the number of used extent records of records corresponding to numbers of 0 to 63 of Extent Records Blocks of FIG. 20 which will be described later.

In the Management Table of FIG. 14, entry corresponding to the block indicated by No. 5 is represented by the format of Extent Records Block Entry shown in FIG. 19. Value of 04 is recorded at the last 1 byte. This indicates that the number of used Extent Records Blocks of Extent Records ER indicated by 64 numbers of 0 to 63 of the Extent Records Blocks shown in FIG. 20 is 4 (respective Extent Records of Nos. 0, 1, 2, 4 have been already used).

Extent Records Block ERB shown in FIG. 13 is constructed as shown in FIG. 20, for example. As shown in this figure, respective Extent Records Blocks ERB of 2k bytes consist of 64 Extent Records ER indicated by No. 0 to No. 63 each having 32 bytes.

Respective Extent Records ER consist of set of data of 4 bytes in which FFFF is recorded at the first 1 byte and seven Extent Record Indexes shown in FIG. 21, or consist of set of eight Extent Descriptors of 4 bytes shown in FIG. 22.

As shown in FIG. 21, Logical Block Offset is allocated to the first 2 bytes of Extent Records Index, Index to ERB is allocated to the next 2 bytes, and Offset of ER is allocated to the last 1 byte.

In the data track, recording/reproduction of data is carried out with Logical Block having 2048 bytes as a unit being as a minimum unit of logical write/read operation. Logical Block Offset indicates logical position from the lading portion within file of data indicated by index. Moreover, Index to ERB is of a structure of 10 bits. Index to Extent Records Block ERB is indicated by any one of numbers 0 to 1023. Offset of ER is of a structure of 6 bits, and indicates any one of 64 Extent Records of Extent Records Block shown in FIG. 20.

As shown in FIG. 22, Extent Start Location is allocated to the first 2 bytes of extent descriptor, and Number of Blocks is allocated to the remaining 2 bytes. This Extent Start Location indicates start position of file recorded in the Extent Area. In addition, Number of Blocks indicates No. of blocks of file which starts from the start position.

In FIG. 20, Extent Record of 32 bytes indicated by No. 1 indicates index. FFFF is recorded at the leading 2 bytes of the first 4 bytes. In the case of this example, 0000 is allocated to the first 2 bytes of the next Extent Records Index as Logical Block Offset. In this case, 5 is stored as Index to ERB, and 2 is stored as Offset of ER.

The fact that Offset of ER is 2 indicates that Extent Records indicated by No. 2 exists in FIG. 20. Its Logical Block Offset indicates 0000. This indicates that No. of the first block of file indicated in the Extent Records indicated by No. 2 is 0000 (i.e., the first block). In the Extent Records of No. 2, it is indicated that one block exists at the fifteenth block in terms of the absolute position (Extent Start Location) on data track at the leading portion (left side in the figure), for example.

It is to be noted that the fact that Index to ERB is 5 indicates that No, of Extent Records Block (shown in FIG. 20) is 5.

The fact that the next Offset of ER is 4 indicates that data of Extent Records indicated by No. 4 exists. In this case, Logical Block Offset is 000B (11 in terms of decimal number). Namely, in this example, the total sum of blocks of Extent Records indicated by No. 2 is 11 (=1+1+2+1+1+1+3+1). For this reason, file starting from the twelfth block (block No. 11) exists at the position where Extent Start Location as an absolute position on mini-disc 1 recorded at the Extent Records indicated by No. 4 is 053C.

It is to be noted that although only seven Extent Records can be represented by single Extent Records Index, in the case where the number of Extent Records increases beyond that, other Extent Record Indexes are further generated. Thus, index representing, as a set, a plurality of Extent Records Indexes is further generated.

Figure 23:
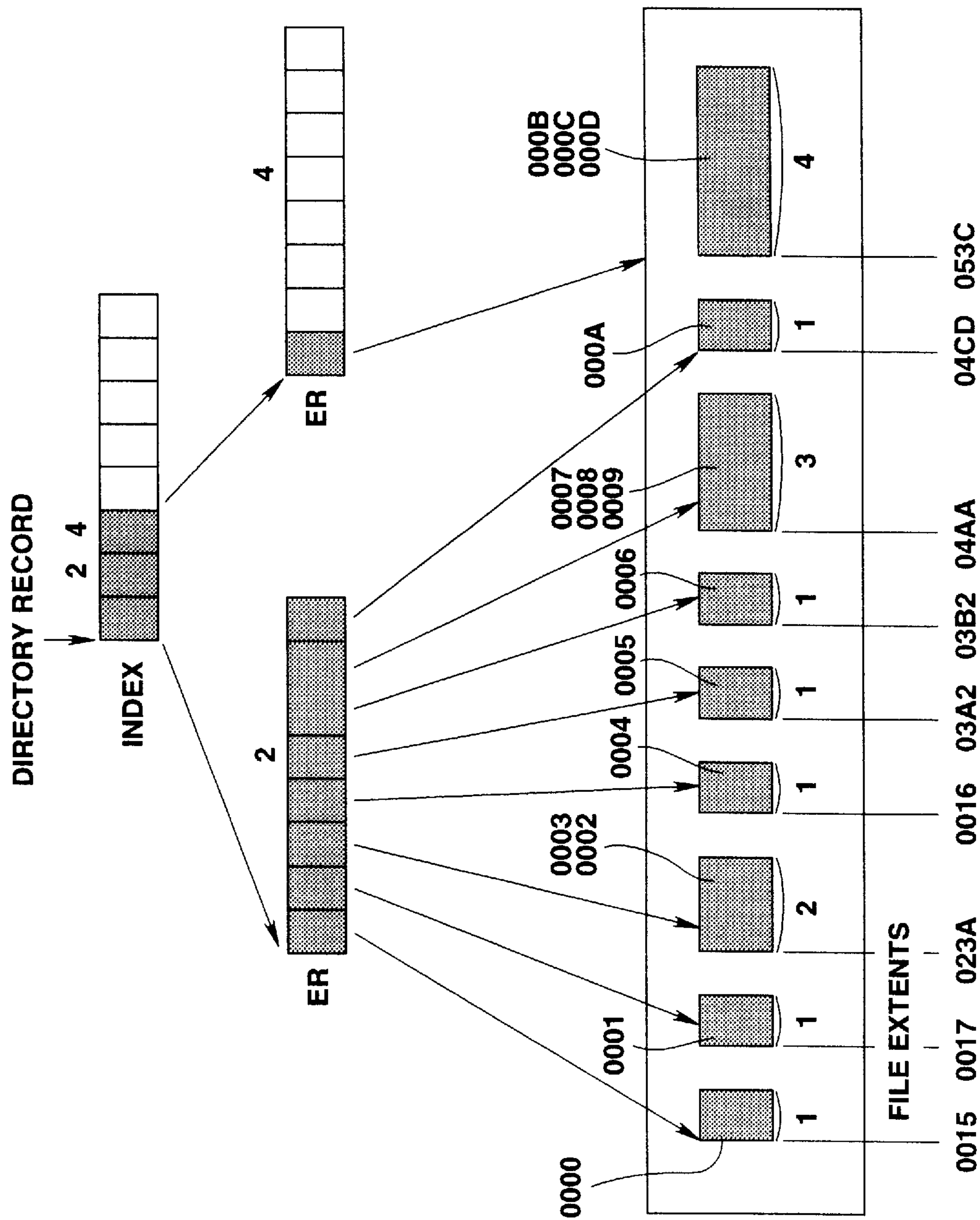
FIG. 23 is a view for explaining the relationship between index and extent record.

FIG. 23 shows, in a model form, the relationship between index and extent records recorded in the Extent Records Block. As shown in this figure, index of a predetermined Extent Records Block ERB is designated from directory record of a predetermined Directory Records Block (Index to ER). At the designated index, seven indexes at the maximum are recorded.

At respective indexes, start positions of 8 files at the maximum (Extent Start Location) and the numbers of blocks constituting those files (Nos. of Blocks) are recorded.

In this example, FAT as shown in FIG. 7 is not used. For this reason, U-TOC in this example is constructed as shown in FIG. 24, for example. As is clear when FIG. 24 is compared to FIG. 3, LOFAT shown in FIG. 3 is not recorded at U-TOC of FIG. 24. Other formats of U-TOC are the same as the case shown in FIG. 3.

In this embodiment, bitmap as shown in FIG. 25 is used in place of FAT. This bitmap is recorded at VSB of FIG. 13.

In this example, one entry of bitmap consists of 2 bits. Similarly to the case of FAT shown in FIG. 7, respective entries corresponds to blocks of predetermined capacities (4k bytes, 8k bytes, 16k bytes, 32k bytes, or 64k bytes) on mini-disc 1. Accordingly, the number of entries is formed by the number corresponding to the recording capacity of mini-disc 1.

At respective entries of 2 bits of the bitmap, data of 2 bits which is indicated by any one of 00, 01, 10 and 11 is recorded. 00 indicates that corresponding block on mini-disc 1 is available and unused block. 01 indicates that corresponding block on mini-disc 1 is used block where data has been already recorded. 10 indicates that corresponding block on mini-disc 1 includes any defective. In addition, 11 indicates that corresponding block on mini-disc 1 is disabled block (use of block is inhibited).

As stated above, link information such as FFDh or No. of blocks to be linked is not recorded into the bitmap unlike FAT shown in FIGS. 7 and 8. Management of these information is carried out by the above-described directory information or file information (particularly Extent Records ER).

Figure 26:
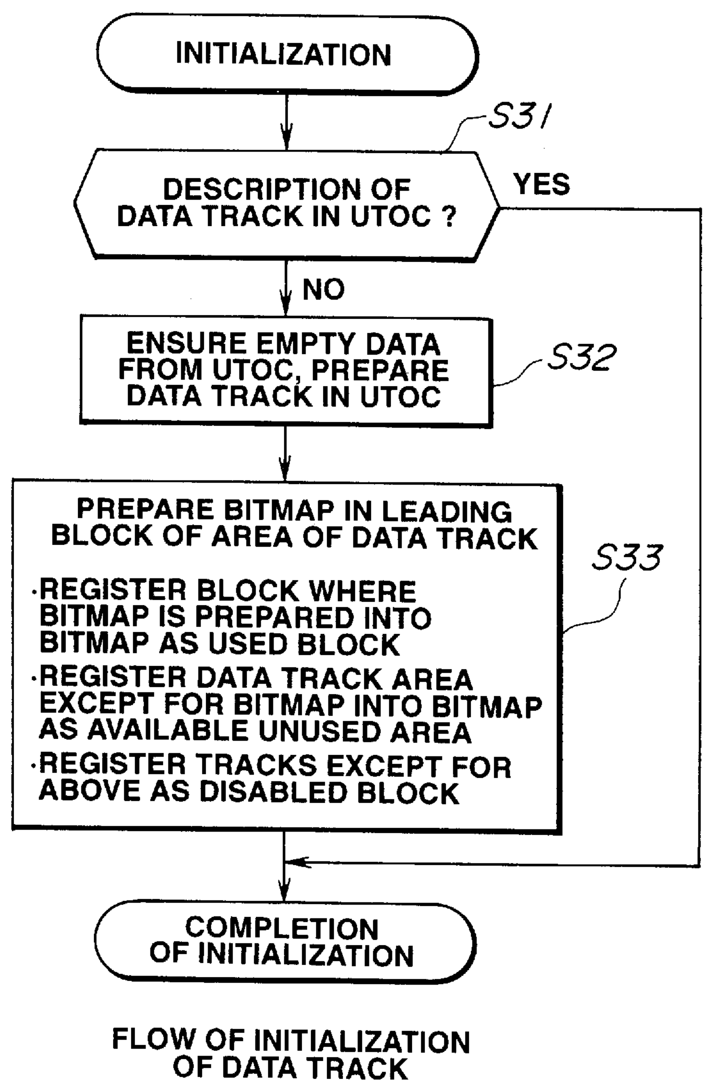
FIG. 26 is a flowchart for explaining another operation for initializing mini-disc 1.

FIG. 26 shows an example of processing executed by host CPU 31 when mini-disc 1 (cartridge 1*a*) is loaded into body 41 of mini-disc device for carrying out recording/reproduction of computer data to instruct initialization. Initially, at step S31, whether or not data track is formed on mini-disc 1 is judged. Whether or not data track is formed can be discriminated from track mode of U-TOC. In the case where any data track exists, since initialization for recording computer data has been already completed (recording area is ensured), initialization processing has been completed.

At step S31, in the case where it is judged that no data track is formed, the processing proceeds to step S32. At this step, empty area (empty parts table) is ensured from U-TOC (data track is ensured). For example, a predetermined number of blocks are ensured as data track for recording computer data from empty area in the program area (whether or not a corresponding area is empty area can be seen from P-TNO1–P-TNO255 of U-TOC). Namely, this area (parts table) is registered into, e.g., P-TNO5, and start address and end address of that area are registered into the parts table. Further, data indicating that corresponding area is the area for recording computer data is registered into the area for track mode of the parts table. In addition, P-FRA of U-TOC is updated.

As described above, the leading 16 clusters of the data track are caused to be VMA, and actual data is recorded into extent areas subsequent thereto (FIG. 12). When the volume of the extent area is ensured by, e.g., 10 clusters, the area of 26 clusters in total (=16+10) are caused to be data track.

Then, the processing proceeds to step S33. At this step, bitmap is written into VSB (FIG. 13) of VMA (FIG. 12) consisting of the leading 16 clusters of the data track ensured at step S32. In the bitmap, data is written as shown in FIG. 25.

Namely, data (01) indicating used block is recorded into the entry corresponding to 16 clusters where VMA is written. Data (00) signifying available unused block is recorded into the entry of bitmap corresponding to 50 clusters (area for recording primary computer data) on the extent area. In addition, data (11) signifying disabled block is recorded into the entry of bitmap corresponding to block on the extent area except for the above.

It is to be noted that in the case where bitmap data is used for management of data track, bitmap data is stored into memory 17 of FIG. 2, and is recorded into bitmap on mini-disc 1 at a predetermined timing.

Figure 27:
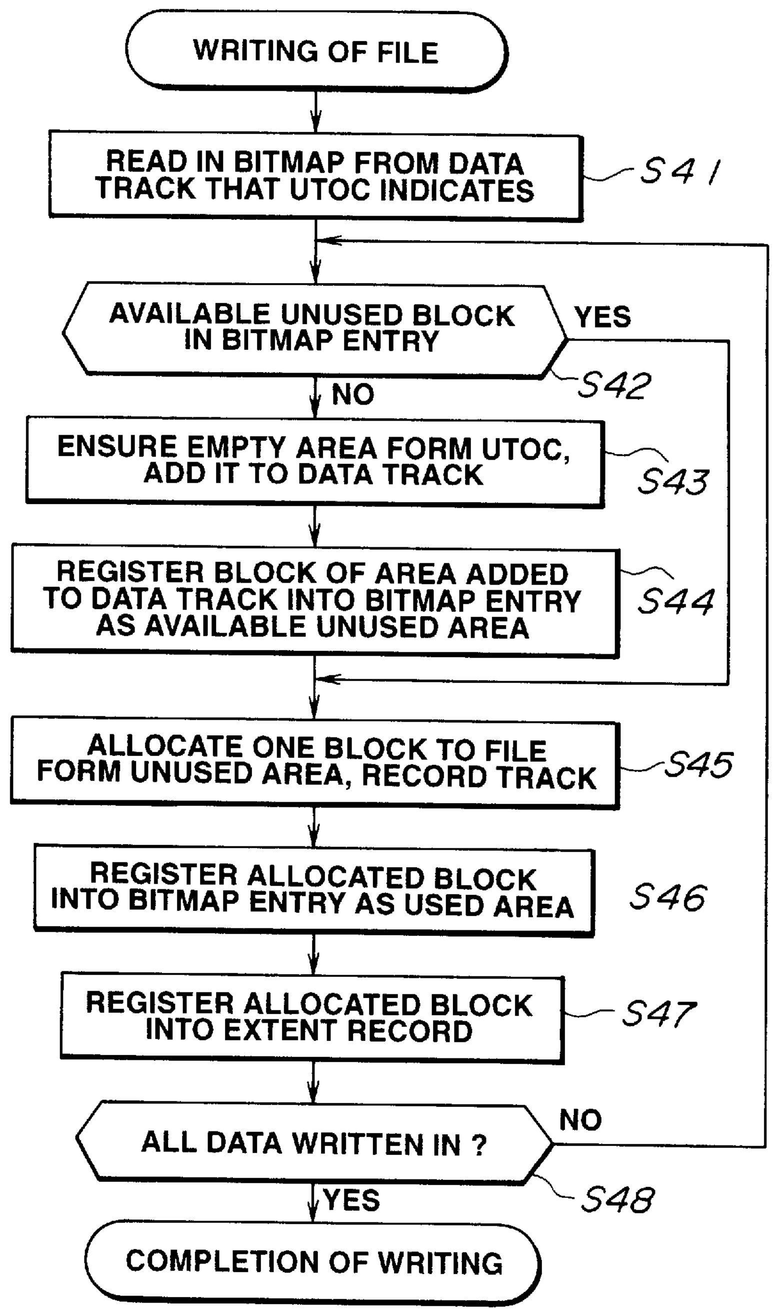
FIG. 27 is a flowchart for explaining another operation in the case of recording computer data onto mini-disc 1.
Figure 29:
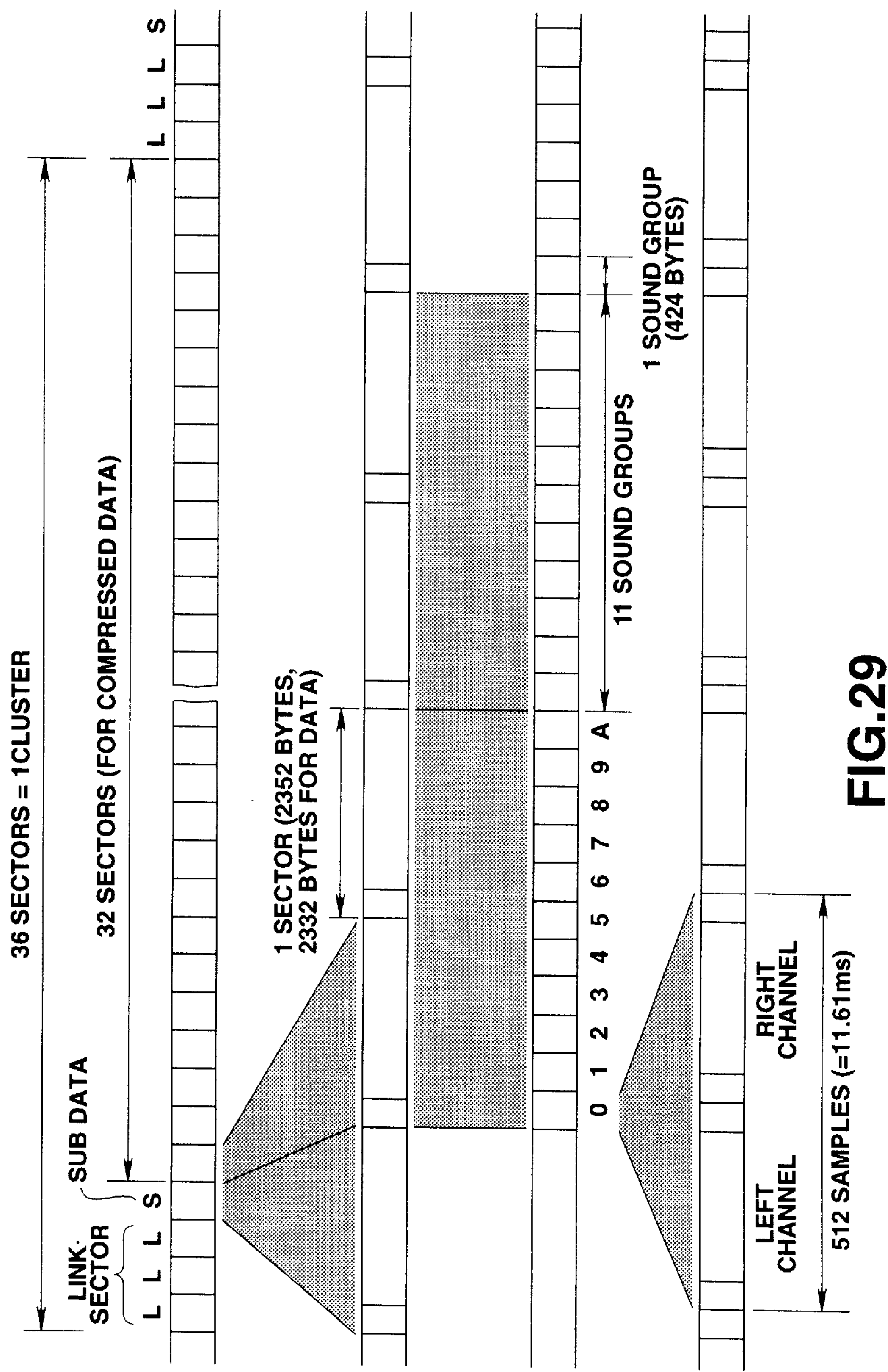
FIG. 29 is a view for explaining format of mini-disc.
Figure 30:
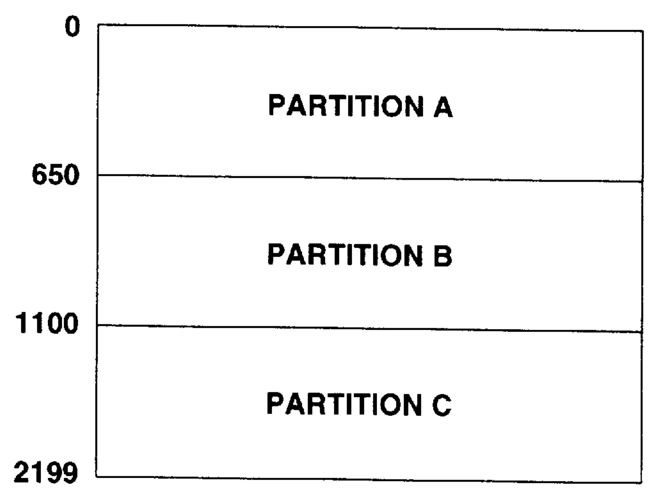
FIG. 30 is a view for explaining concept of partition.

FIG. 27 shows an example of processing executed by host CPU 31 in the case where computer data is recorded onto mini-disc 1. Initially, at step S41, host CPU 31 reads in data of bitmap recorded on mini-disc 1. As described above, volume management area including data of bitmap is formed at the leading portion of data track initially formed in the program area. Thus, there is employed a method of detecting start address of parts table corresponding to the leading portion of data track initially formed from U-TOC to read out volume descriptor on the basis of this start address to read out bitmap on the basis of position information of bitmap recorded thereat, thereby making it possible to read bitmap into host CPU 31. This bitmap data is temporarily stored into memory 17. Thus, host CPU 31 reads thereinto this data at a predetermined timing.

Then, the processing proceeds to step S42. At this step, whether or not there is available unused entry (block of 00) in the bitmap currently read in is judged. In the case where computer data is initially recorded, since available unused block exists, the processing proceeds from step S42 to step S45. At step S45, one entry (e.g., entry 80 of bitmap of FIG. 28) is selected from unused blocks to allow this entry to correspond to file into which data is to be written. Then, data is actually written into block on the extent area to which that entry corresponds.

Then, the processing proceeds to step S46. At this step, data (01) indicating used area is recorded into the entry of bitmap corresponding to block of the extent area where recording is carried out (FIG. 28). Further, the processing proceeds to step S47 to register block of that extent area into the extent record ER (FIG. 13, FIG. 20).

Then, the processing proceeds from step S47 to step S48. At the step S48, whether or not writing of all data is completed is judged. Unless such a writing is completed, the processing returns to step S42. An operation as described above will be repeated.

The state of bitmap in the case where data is recorded into block of extent area corresponding to entries 80 to 89 on bitmap in a manner stated above is shown in FIG. 28.

In the case where ensured area is filled with data as the result of repetition of the above-described operation, and it is judged at step S42 that entry indicating available unused block does not exist in the bitmap, i.e., when there is no empty area for recording computer data, the processing proceeds to step S43 to ensure empty area of U-TOC to supplement that empty area as data track for recording computer data. Then, the processing proceeds to step S44 to register block of the supplemented area of the data track as available unused block. Namely, processing similar to those at steps S32, S33 in the initialization processing of FIG. 26 is carried out to newly ensure (supplement) data recording area of 12 blocks. It is to be noted that the number of blocks supplemented at this time is arbitrary. In this case, however, since bitmap has been already prepared, only data corresponding thereto is updated without newly preparing such bitmap.

In the case where it is judged at step S48 that writing of all data has been completed, the processing is completed.

In the above-described respective embodiments, in the case where unit for carrying out management by FAT or bitmap is a value smaller than one cluster, in order to record data with respect to one unit, body 41 once reads out data of one cluster including that unit from mini-disc 1 to store it into RAM 13. Then, data corresponding to that unit is transferred from host CPU 31, and is then newly stored into RAM 13. Then, data of one cluster which has been read out from RAM 13 is written into mini-disc 1. Namely, recording in a unit substantially smaller than one cluster can be made. On the other hand, reproduction is carried out in sector unit.

It is to be noted that while management of recording data with respect to writable mini-disc 1 has been described in the above-described embodiments, recording data management of the above-described embodiments can be also applied to mini-disc 1 dedicated to read-out. It should be noted that no U-TOC area is provided with respect to mini-disc 1 dedicated to read-out. Thus, there is employed a scheme to set table of a structure substantially similar to U-TOC of the above-described embodiments in the TOC area to set VMA similar to the above-described embodiments in the program area, thereby to realize the above-described recording data management.

INDUSTRIAL APPLICABILITY

As stated above, in accordance with the recording medium management method of this invention, a scheme is employed to designate a predetermined range from the range of recording medium caused to undergo management in accordance with first table to carry out management of recording state onto recording medium of digital data having second unit as reference in accordance with second table. Accordingly, it is possible to ensure compatibility with recording medium on which digital data is recorded with the first unit being as reference. Further, if there is any empty area in the recording medium, it is possible to supplement digital data in the area to record it.

Further if the second unit is caused to be smaller than the first unit, it is possible to record data in a processing unit smaller than a processing unit set in advance.

In addition, in the case where the second unit is caused to have the same size as that of the second unit, a scheme is employed to register one large track into the first table to partition this track into much more plural areas on the second table so that there are provided partitions more than partitionable numbers in the first table (255 of P-TNO1 to P-TNO255 in the case of the above-mentioned embodiment), thus making it possible to record data.

We claim:

1. A recording medium management method for carrying out management of recording digital data with respect to a recording medium, wherein management of recording digital data onto the recording medium where recording is carried out in first data recording units is carried out in accordance with a first table, wherein a designated area of the recording medium is caused to undergo management in accordance with the first table to carry out recording in second data recording units with respect to the designated area, wherein management of recording digital data onto the recording medium in the designated area, where recording is carried out in second data recording units, is carried out in accordance with a second table, wherein data corresponding to the respective second data recording units are formed in the second table, and wherein data corresponding to the respective second data recording units include information indicating whether digital data already has been recorded, in the corresponding second data recording units of the recording medium.

2. A recording medium management method as set forth in claim 1, wherein data corresponding to the respective second data recording units include information indicating that the corresponding second data recording units of the recording medium are disabled.

3. A recording medium management method as set forth in claim 1, wherein data corresponding to the respective second data recording units include information indicating that the corresponding second data recording units of the recording medium are defective.

4. A recording medium management method as set forth in claim 1, wherein link information within the first table is further recorded in the second table.

5. A recording medium management method for carrying out management of recording digital data with respect to a recording medium, wherein management of recording digital data onto the recording medium where recording is carried out in first data recording units is carried out in accordance with a first table, wherein a designated area of the recording medium is caused to undergo management in accordance with the first table to carry out recording in second data recording units with respect to the designated area, wherein management of recording digital data onto the recording medium in the designated area, where recording is carried out in second data recording units, is carried out in accordance with a second table, and wherein when in the area where recording is carried out by the first data recording units an unrecorded area is insufficient, an area where recording is carried out by the second data recording units is changed to an area on the first table, and wherein when in the area where recording is carried out by the second data recording units an unrecorded area is insufficient, an area where recording is carried out by the first data recording units is changed to an area on the second table.

6. A recording medium management method as set forth in claim 5, wherein the second data recording unit is smaller than the first data recording unit.

7. A recording medium management method as set forth in claim 6, wherein the first data recording unit is cluster and the second data recording unit is block.

8. A recording medium management method as set forth in claim 5, wherein the second data recording unit is the same size as that of the first data recording unit.

9. A recording medium management method as set forth in any one of claims 5, 6, 7 or 8, wherein the first table is recorded in User's Table of Contents (hereinafter simply referred to as U-TOC) or Table of Contents (hereinafter simply referred to as TOC) of the recording medium, and wherein the second table is recorded in the area caused to undergo management by the first table of the recording medium.

10. A recording medium management method as set forth in claim 9, wherein a pointer indicating recording position of the second table is recorded in the U-TOC or TOC.

11. A recording medium management method as set forth in any one of claims 5, 6, 7 or 8, wherein different kinds of digital data are respectively recorded in the area caused to undergo management by the first table and in the area caused to undergo management by the second table.

12. A recording medium management method as set forth in claim 11, wherein audio digital data is recorded in the area caused to undergo management only by the first table, and wherein digital data processed by computer is recorded into the area caused to undergo management by the second table.

13. A recording medium management method as set forth in any one of claims 5, 6, 7 or 8, wherein data corresponding to the respective second data recording units are formed in the second table.

14. A recording medium management method as set forth in claim 9, wherein the U-TOC or TOC is recorded in a fixed area of the recording medium.

15. A recording medium management method as set forth in claim 9, wherein the second table is bitmap.

16. A recording medium management method as set forth in claim 9, wherein information indicating position of the second table is recorded immediately before the second table.

17. A medium for recording digital data comprising:

a first area in which a first table for carrying out management of tracks for digital data by first data recording units is recorded; and a second area in which the digital data and a second table for carrying out management, by second data recording units, of tracks for digital data is recorded, wherein when in the first area where recording is carried out by the first data recording units an unrecorded area is insufficient, an area where recording is carried out by the second data recording units is changed to an area on the first table, and wherein when in the second area where recording is carried out by the second data recording units an unrecorded area is insufficient, an area where recording is carried out by the first data recording units is changed to an area on the second table.

18. A medium as set forth in claim 17, wherein the second table is recorded at a track for digital data initially formed in the second area.

19. A medium as set forth in claim 17, wherein information indicating position of the second table is recorded at the track for digital data initially formed in the second area.

20. A medium as set forth in claim 17, wherein the second table is bitmap.

21. A medium as set forth in claim 17, wherein the first table is U-TOC.

22. A medium as set forth in claim 17, wherein the first table carries out management of recording state of the digital data by first data recording units, and the second table carries out management of recording state of the digital data by second data recording units less than the first data recording units.

23. A medium for recording or reproducing digital data, wherein a first table for carrying out management of tracks for digital data by first data recording units and a second table for carrying out management of the tracks for digital data by second data recording units at tracks for digital data caused to undergo management by the first table are recorded, and wherein when in an area where recording is carried out by the first data recording units an unrecorded area is insufficient, an area where recording is carried out by the second data recording units is changed to an area on the first table, and wherein when in the area where recording is carried out by the second data recording units an unrecorded area is insufficient, an area where recording is carried out by the first data recording units is changed to an area on the second table.

24. A medium as set forth in claim 23, wherein the second table is bitmap.

25. A medium as set forth in claim 23, wherein the first table is U-TOC or TOC.

26. A medium as set forth in claim 23, wherein the second data recording unit is the same size as that of the first data recording unit.

27. A medium as set forth in claim 23, wherein the second table is recorded in a track for digital data initially formed.

28. A medium as set forth in claim 23, wherein information indicating position of the second table is recorded at the track for digital data initially formed.

29. A recording medium management method for managing the recording of digital data onto a recording medium, wherein digital data is recorded onto a recording medium in first data recording units, wherein the recording in first data recording units is managed in accordance with a first table, wherein digital data is recorded onto a designated area of the recording medium in second data recording units, wherein the designated area of the recording medium is managed in accordance with the first table to carry out recording in second data recording units with respect to the designated area, wherein the recording of digital data in second data recording units is managed in accordance with a second table, and wherein when in an area where recording is carried out by the first data recording units an unrecorded area is insufficient, an area where recording is carried out by the second data recording units is changed to an area on the first table, and wherein when in the area where recording is carried out by the second data recording units an unrecorded area is insufficient, an area where recording is carried carried out by the first data recording units is changed to an area on the second table.

* * * * *